United States Patent
Chen et al.

(10) Patent No.: US 10,094,964 B2
(45) Date of Patent: Oct. 9, 2018

(54) DIRECT BACK-LIT LIGHT GUIDE STRUCTURE, LIGHT GUIDE PLATE AND BACK-LIT MODULE

(71) Applicant: Entire Technology Co., Ltd., Taoyuan County (TW)

(72) Inventors: Yan Zuo Chen, Taoyuan County (TW); Wei-Chen Lin, Taoyuan County (TW)

(73) Assignee: Entire Technology Co., Ltd. (TW)

( * ) Notice: Subject to any disclaimer, the term of this patent is extended or adjusted under 35 U.S.C. 154(b) by 322 days.

(21) Appl. No.: 14/981,084

(22) Filed: Dec. 28, 2015

(65) Prior Publication Data

US 2016/0195667 A1    Jul. 7, 2016

(30) Foreign Application Priority Data

Jan. 5, 2015   (TW) .............................. 104100022 A

(51) Int. Cl.
  *G09F 13/04*  (2006.01)
  *F21V 8/00*   (2006.01)

(52) U.S. Cl.
  CPC .......... *G02B 6/0018* (2013.01); *G02B 6/0036* (2013.01); *G02B 6/0055* (2013.01); *G02B 6/0068* (2013.01)

(58) Field of Classification Search
  CPC .. G02B 6/0018; G02B 6/0036; G02B 6/0068; G02B 6/0055; G02B 1/133604; G02B 1/133608; G02B 1/133606

USPC ........................................................ 362/97.1
See application file for complete search history.

(56) References Cited

U.S. PATENT DOCUMENTS 8,297,786 B2 *  10/2012  Shani .................... G02B 5/021
                                                        362/247

* cited by examiner

*Primary Examiner* — Elmito Breval
*Assistant Examiner* — Omar Rojas Cadima

(57) ABSTRACT

A direct back-lit light guide structure is applied to a light guide plate and a back-lit module. The light guide plate has a light-ejection surface and a light-inject surface opposite to the light-ejection surface. The back-lit module comprises at least one point-light source located on the light-ejection surface. The direct back-lit light guide structure comprises at least one asymmetric concave structure formed on the light-ejection surface, and each the point-light source is corresponding to one asymmetric concave structure in such a manner that the point-light source projects light directly toward the asymmetric concave structure. Each the asymmetric concave structure has a central lowest point. The point-light source is located right below the central lowest point. The direct back-lit light guide structure has advantages of better optical uniformity, higher illumination efficiency, fewer point-light sources required, lower cost, narrower side-frame and thinner light guide plate.

8 Claims, 31 Drawing Sheets

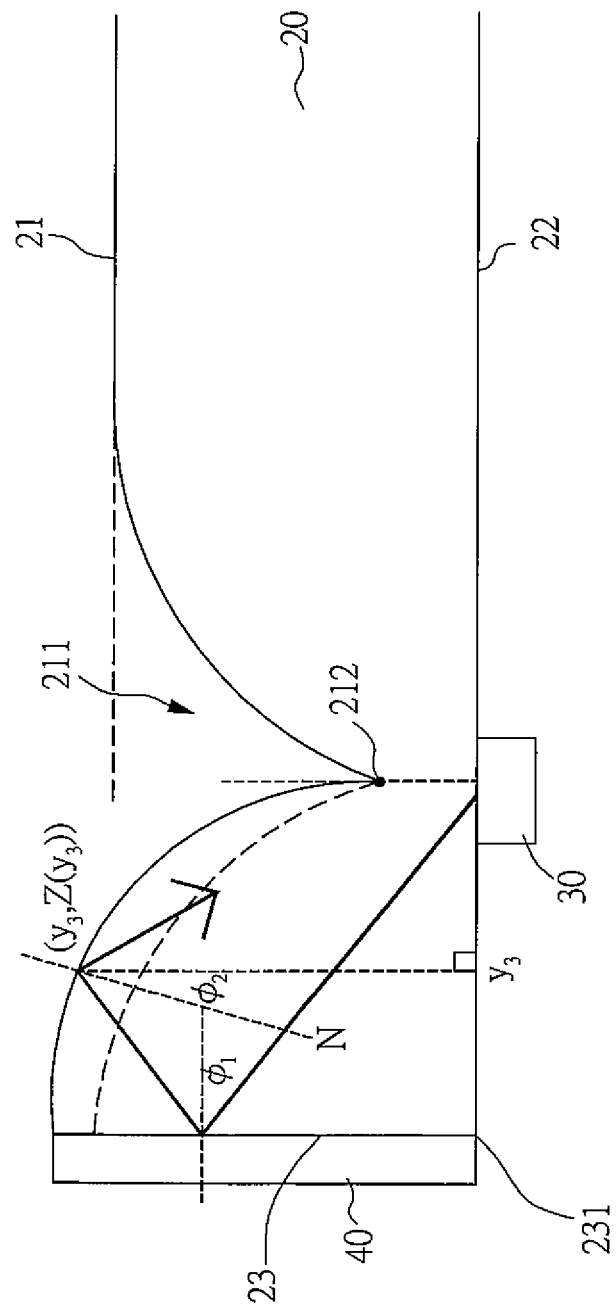

DIRECT BACK-LIT LIGHT GUIDE STRUCTURE, LIGHT GUIDE PLATE AND BACK-LIT MODULE

This application claims the benefit of Taiwan Patent Application Serial No. 104100022, filed Jan. 5, 2015, the subject matter of which is incorporated herein by reference.

BACKGROUND OF INVENTION

1. Field of the Invention

The invention relates to a direct light guide structure, a light guide plate and a back-lit module, and more particularly to the direct light guide plate and the back-lit light module that implement a direct light guide structure to achieve advantages in better uniformity of back lights, higher efficiency of luminance, fewer point-light sources required, lower cost, narrower side-frames and less thickness.

2. Description of the Prior Art

Currently, in the marketplace, back-lit modules for optical display devices can be mainly classified into a group of edge back-lit light guide plates and another group of direct back-lit light guide plates. The back-lit module of the edge back-lit light guide plate has a major disadvantage in emission efficiency. The reason for such a shortcoming is that plural light sources (particularly, LEDs, the point light sources) constructed on one lateral side surface of the light guide plate can only provide one half of the emission lights at most to penetrate the light-ejection surface of the light guide plate. However, on the other hand, the back-lit module of the conventional direct back-lit light guide plate can provide better emission efficiency. Actually, in the direct back-lit light guide plate, the light source (also particularly, LEDs, the point light sources) is directly constructed the other side of the surface of the light guide plate facing the light-ejection surface, and thus the light source is physically to emit at the light-ejection surface. Therefore, the back-lit module of the edge back-lit light guide plate presents much more serious problems in phenomena of light spots and dark spots.

Referring now to FIG. 1A and FIG. 1B, a thin direct back-lit module disclosed by Taiwan utility patent No. M462874 includes a plurality of LED light sources 0100 evenly distributed on the opposing side (bottom surface in the figure) of the light guide plate 0212 with respect to the light-ejection surface (top surface in the figure). On the light-ejection surface (top surface) of the light guide plate 0212, a plurality of concave structures 0202 is included, and each f the concave structures 0202 is set to be disposed correspondingly one LED light source 0100 located on the bottom surface. Thereby, the concave structures 0202 can be used to reflect the rays emitted by the corresponding LED light source 0100, such that uniformity of illumination can be obtained. However, in applying M462874, if the concave structures 0202 contribute a perfect total reflection, the visible region would meet a problem of central dark spotting, which requires a wavy surface structure or designed scratches to resort. Contrarily, if the total reflection is poor, then the visible region would meet a problem of light spotting. In this circumstance, the inclined contour of the concave structure 0202 shall be purposely to include two light segments with different slopes, and thus the surface is not smooth, the total reflection would be even poorer, the light loss would be high, and the manufacturing to produce such a contour for the concave structure 0202 would be more difficult. Thus, further improvement thereupon is definite.

In the Japan Patent Publication No. JPA 2008078089, an LED illumination apparatus includes a plurality of LED light source to encircle the lower rim of the light guide plate, and concave structures are located at the upper rim thereof in correspondence with the LED light sources. However, similar technical shortcomings met in JPA 2008078089, as described in M462874, that the contour of the concave structure is not smooth, though continuous, for consisting a number of connected curve segments with at least two different curvatures. Definitely, the segmented contour can't present a satisfied total reflection and venerable to lose lights.

In addition, in Taiwan Patent Publication No. TW 200925518, an illumination apparatus is to mount a plurality of LED light sources to the lower rim of the light guide plate, and to construct corresponding groove structures on the light guide plate. However, in TW 200925518, both lateral side of the groove structure are individually formed as respective straight lines with fixed slopes, and the slope of the groove bottom is zero. Thus, smoothness is not shown in the contour of the groove structure of TW 200925518. Similar to M462874, contour of the groove structure of TW 200925518 is though continuous, but not smooth, and can only contribute poor total reflection and is opt to lose lights.

SUMMARY OF THE INVENTION

Accordingly, it is the primary object of the present invention to provide a direct light guide structure, a light guide plate and a back-lit module that implements the direct light guide structure to achieve better uniformity of back-light, higher efficiency of luminance, fewer point-light sources required, lower cost, a narrower side-frame and a thinner light guide plate.

In the present invention, the direct light guide structure is applied to a light guide plate of a direct back-lit module. The guide plate has a light-ejection surface and a light-inject surface opposing to the light-ejection surface. An orthogonal X-Y-Z coordinate system is defined with the light guide plate. A thickness of the light guide plate is extended in a Z direction, and an X direction and a Y direction are extended on the light-inject surface. The back-lit module has at least one point-light source located aside to the light-inject surface. The direct light guide structure comprises:

at least one concave structure, located on the light-ejection surface of the light guide plate, each of the at least one point-light source being disposed corresponding to the at least one concave structure so as to have a light ray emitted by the at least one point-light source to irradiate the at least one concave structure;

wherein each of the at least one concave structure has a central lowest point located at a place right above the corresponding at least one point-light source, and the central lowest point and the light-ejection surface are connected by continuous configurations.

The configurations of the concave structure on a Y-Z cutting plane crossing the central lowest point of the concave structure of the light guide plate are expressed as:

$$Z1(y)=z01-a1*\exp(-|y|/t1), \text{ for } -r01<y<0;\qquad \text{Equation 1:}$$

$$Z2(y)=z02-a2*\exp(-|y|/t2), \text{ for } 0<y<r02;\qquad \text{Equation 2:}$$

wherein the z01 and the z02 are maximal thicknesses for a lateral portion and a main plate portion of the light guide plate, respectively; the main plate portion is in a +Y direction while the lateral portion is in a −Y direction; the a1 and the a2 are maximal depths to the central lowest point from tops of the lateral portion and the main plate portion, respectively; the t1 and the t2 are variables for the configurations of the concave structure at the lateral portion and the main plate portion, respectively; the r01 and the r02 are radii of the concave structure with respect to a Z axis passing the central lowest point for the configurations of the concave structure at the lateral portion and the main plate portion, respectively; the Z1(y) expressed as a thickness variable defines the configuration curve for the concave structure at the lateral portion while the Z2(y) expressed also as another thickness variable defines the configuration curve for the concave structure at the main plate portion; and, the y is a real number ranging between −r01 and r02; wherein $0.7 \leq t1 \leq 1.4$, $0.7 \leq t2 \leq 1.5$, 3 mm $\leq$ z02 $<$ 7 mm, 3 mm $<$ z01 $\leq$ 7 mm and 67% $\leq$ (a2/z02) $<$ 100%.

In one embodiment of the present invention, the concave structure is an asymmetric concave structure having z01>z02 and 3.5 mm $\leq$ z01 $\leq$ 7 mm.

In one embodiment of the present invention, the at least one point-light source has a at least two point-light sources, these point-light sources are located under the light-injection surface of the light guide plate in a cluster manner by closing to one of lateral side of the light guide plate, these point-light sources being evenly distributed to the light-inject surface of the light guide plate by extending in a longitudinal direction of the lateral side and by closing to a lower portion of the lateral side, wherein the Y-Z cutting plane is perpendicular to both the lateral side and the light-ejection surface.

In one embodiment of the present invention, a reflection plate is mounted to a lateral side surface of the lateral side right at a place corresponding to these point-light sources, the reflector plate reflecting light rays emitted by these point-light sources totally back to the light guide plate.

In another aspect of the present invention, a light guide plate and a back-lit module are provided, and both of which include the aforesaid direct light guide structure.

All these objects are achieved by the direct light guide structure, the light guide plate and the back-lit module described below.

BRIEF DESCRIPTION OF THE DRAWINGS

The present invention will now be specified with reference to its preferred embodiment illustrated in the drawings, in which:

FIG. 6B is a schematic view of a light ray path for the situation of z01>z02 for the concave structure in accordance with the present invention;

DESCRIPTION OF THE PREFERRED EMBODIMENT

The invention disclosed herein is directed to a direct light guide structure, a light guide plate and a back-lit module. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
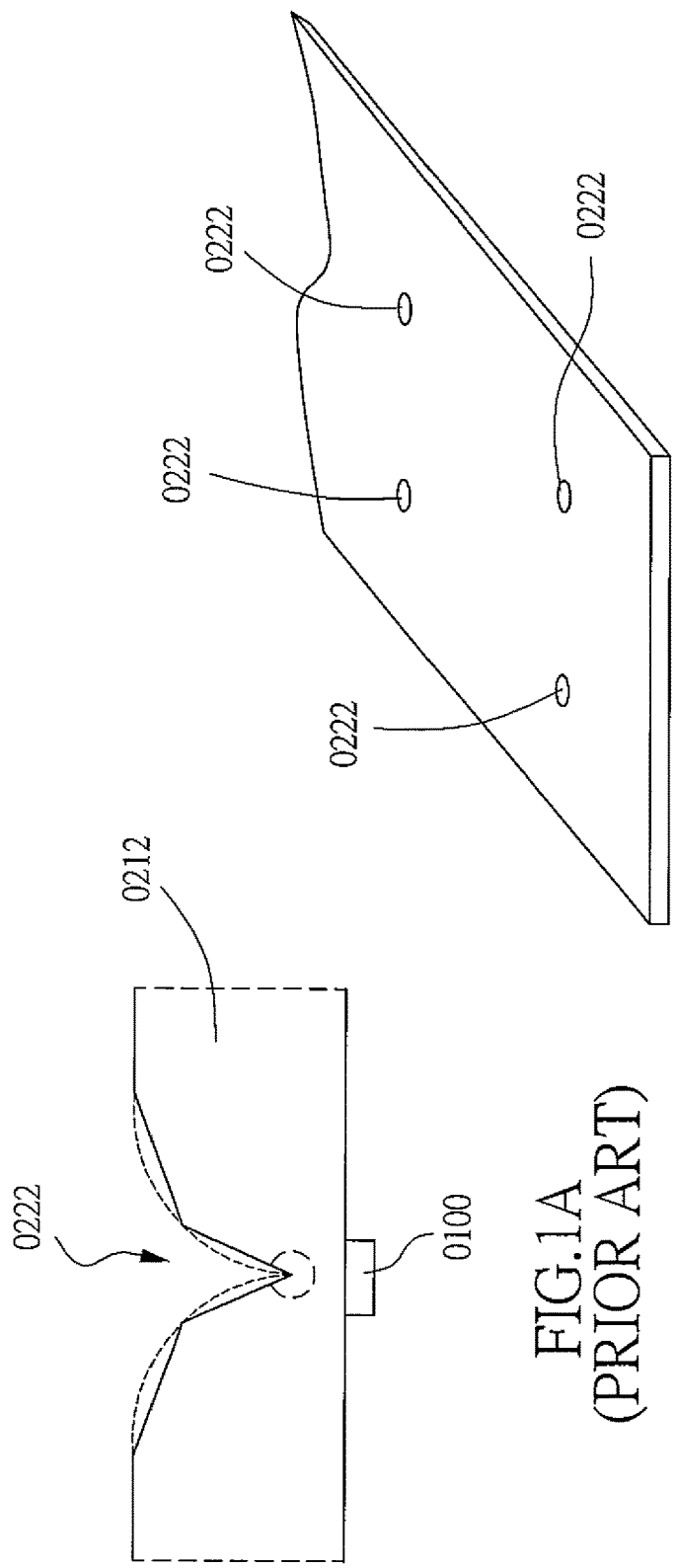
FIG. 1A and FIG. 1B demonstrate the same thin direct back-lit module of Taiwan Utility Patent No. M462874.
Figure 2:
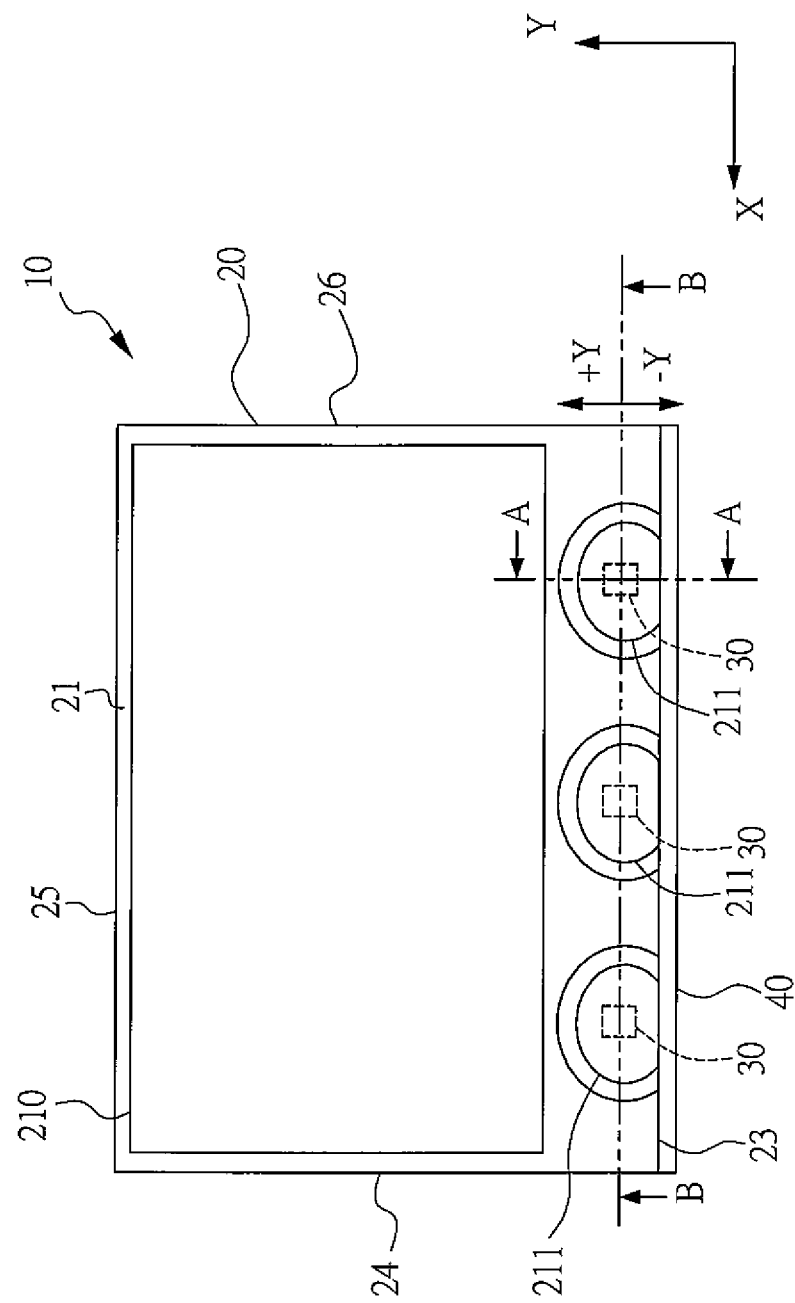
FIG. 2 is a schematic top view of an embodiment of the back-lit module having the direct light guide structure in accordance with the present invention.
Figure 3:
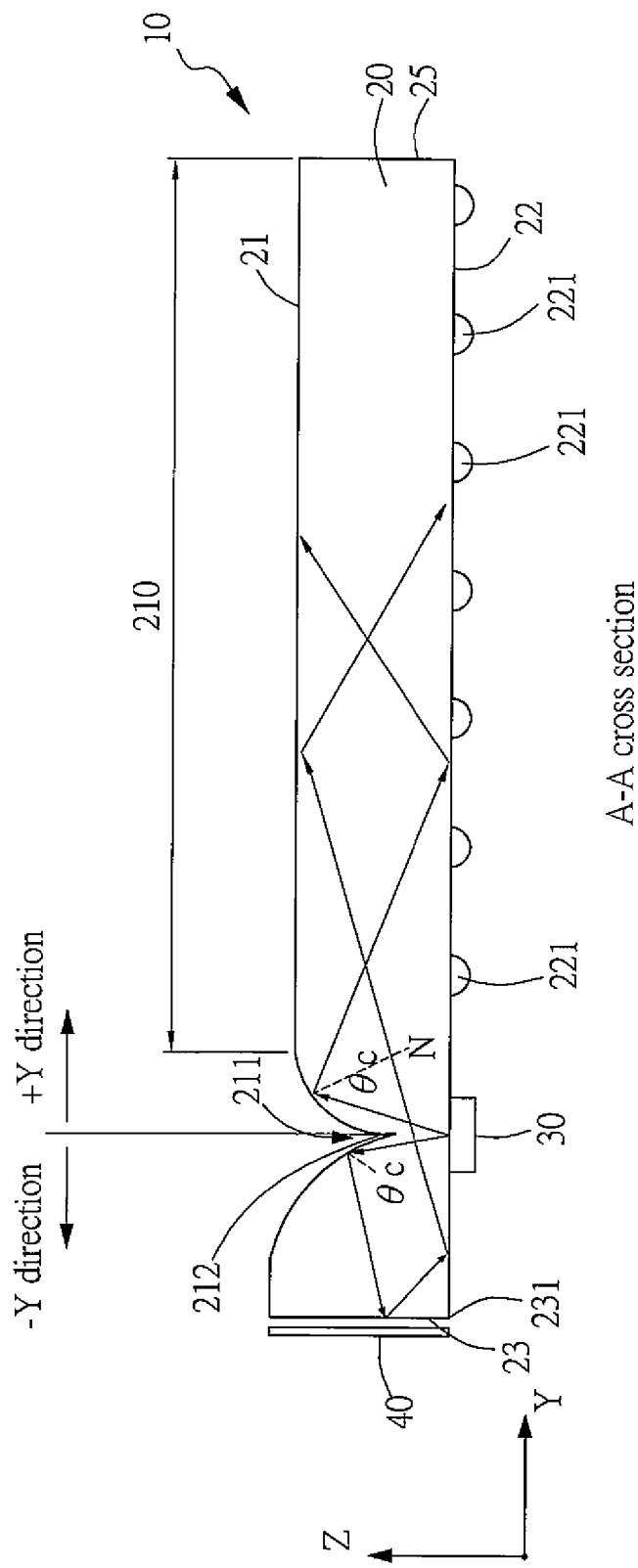
FIG. 3 is a cross sectional view of FIG. 2 along line A-A.
Figure 4:
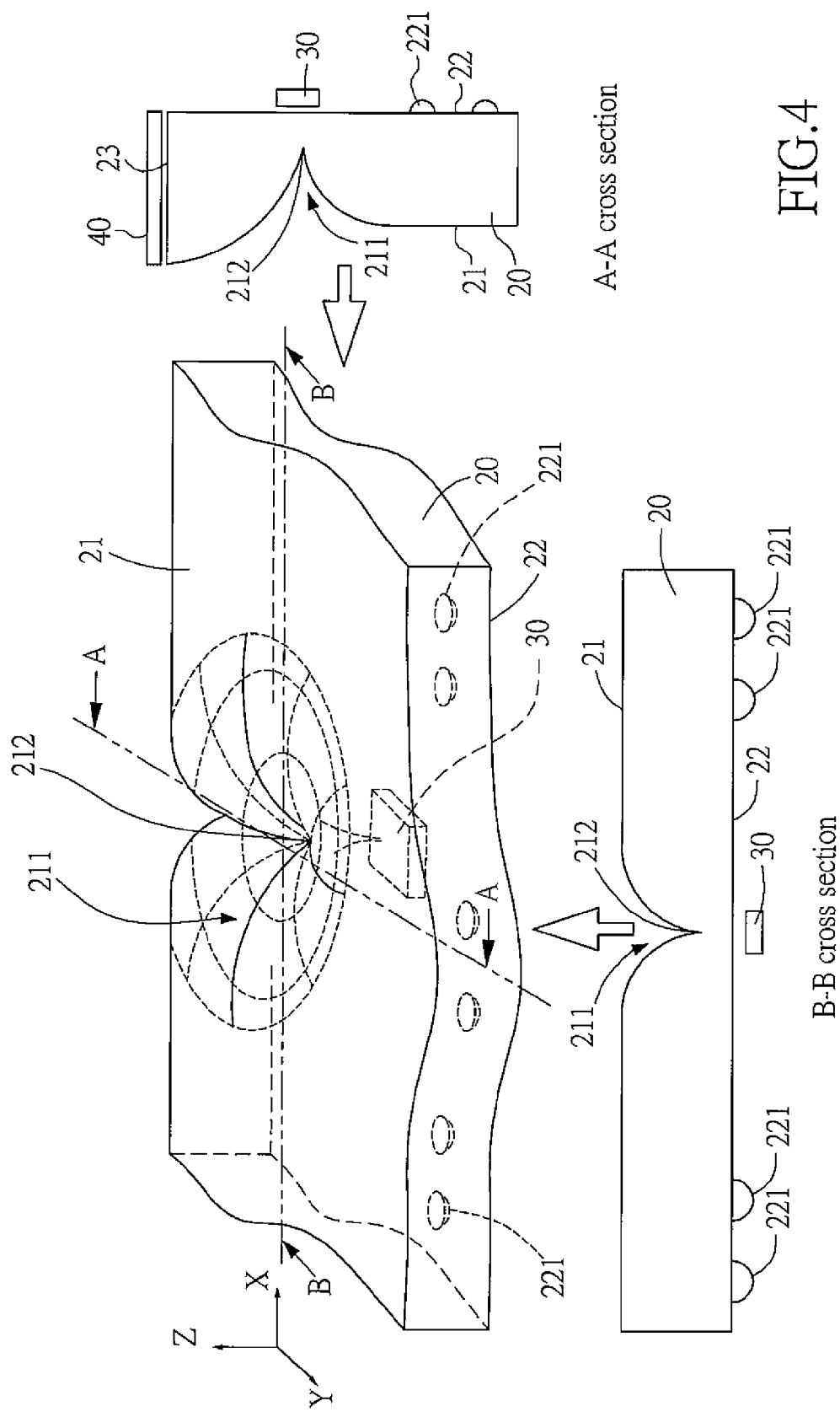
FIG. 4 demonstrates schematically three views upon the asymmetric concave structure of FIG. 2, in an enlarged perspective view, a cross sectional view along line A-A and a cross sectional view along line B-B.

Refer now to FIG. 2, FIG. 3 and FIG. 4; where FIG. 2 is a schematic top view of an embodiment of the back-lit module having the direct light guide structure in accordance with the present invention, FIG. 3 is a cross sectional view of FIG. 2 along line A-A, and FIG. 4 demonstrates schematically three views upon the asymmetric concave structure of FIG. 2, in an enlarged perspective view, a cross sectional view along line A-A and a cross sectional view along line B-B.

The light guide plate 20 formed as a broad thin plate structure has a top surface 21, a bottom surface 22 and four small thin slender lateral surfaces 23, 24, 25, 26 connecting the top surface 21 and the bottom surface 22. In this embodiment, the top surface 21 of the light guide plate 20 is defined as the light-ejection surface. A plurality of point-light sources 30 is mounted beneath the bottom surface 22 (defined as the light-injection surface) of the light guide plate 20 and is to emit lights vertically upward to irradiate the light-ejection surface 21. In the present invention, the plurality of point-light sources 30 is constructed preferably as a plurality of LED point-light sources. One of major features of the present invention is that these point-light sources 30 are not evenly or uniformly distributed over the bottom surface 22 of the light guide plate 20, but mounted beneath the bottom surface 22 of the light guide plate 20 in a cluster manner by closing to a specific lateral side surface 231 (as shown in FIG. 4, the left lateral side 23). The point-light sources 30 are evenly distributed to the bottom surface 22 of the light guide plate 20 by extending in the longitudinal direction of the lateral side surface 231 and by closing to the left-hand-side lateral side 23. Namely, these point-light sources 30 are distributed in an equal-space manner under the bottom surface 22 by closing to the lateral side surface 231. In addition, a reflection plate 40 is mounted to the lateral side 23 right at the place corresponding to each of the point-light sources 30 on the lateral side surface 231. By providing the reflector plate 40, the light rays emitted by these point-light sources 30 and toward the reflector plate 40 can be totally reflected back to the interior of the light guide plate 20, such that possible light loss at the lateral side 23 having the reflector plate 40 can be substantially avoided. Further, on the rest of the bottom surface 22 of the light guide plate 20 other than those having the point-light sources 30, a plurality of micro structures 221 are constructed all over the entire bottom surface 22 of the light guide plate 20. At the places on the top surface 21 (the light-ejection surface) of the light guide plate 20 that account respectively for the point-light sources 30 on the bottom surface 22 (i.e., the places on the top surface 21 (the light-ejection surface) of the light guide plate 20 that are close to the lateral side surface 231, or the places at the lateral side 23 by closing to the reflector plates 40), corresponding asymmetric light guide structures 211 are individually constructed. Configuration curves for establishing each of the asymmetric light guide structures 211 are specifically derived by the following configuration curve equations provided by the present invention. The emitted light ray of the point-light source 30 is directed upward to approach the asymmetric light guide structure 211, and generates an incident angle at the asymmetric light guide structure 211, in which the incident angle is larger than the corresponding total reflection angle so as to achieve the total reflection. Hence, light rays won't leak from top portions of the asymmetric light guide structure 211. Namely, the asymmetric light guide structure 211 would have light rays of the point-light sources 30 to irradiate the visible region 210 in a uniform and more efficient manner. Since the opening of the asymmetric light guide structure 211 has different radii and thickness in the −Y and +Y directions, better optical performance and back-light efficiency can be obtained. While the aforesaid light guide plate 20 of the direct light guide structure is applied to form a back-lit module 10, the area having the asymmetric light guide structure 211 and the point-light sources 30 can be covered by the side frames so as to avoid the light loss caused by manufacturing errors or the dark spots caused by excessive total reflection, such that the optical performance in the visible region can be homogeneous and the mixing of light rays from these point-light sources 30 can display no significant dark spots or light spots (i.e., hot spots).

In the present invention, the point-light source 30 is a type of direct illumination. The asymmetric light guide structure 211 is located on the top surface 21 (the light-ejection surface) of the light guide plate 20 by closing to the reflector plate 40, and is shaped as a cavity with asymmetric sidewall contours. For example, as shown in the figures, the curvatures of the sidewalls, the radii of the cavity at the opening and the thickness thereof are not identical to the shaping curves of the cavity in the −Y (left in the figures) and the +Y (right in the figures) directions. In this embodiment, the −Y direction is the direction of the lateral side 23 that mounting the reflector plate 40, while the +Y direction is the direction away from the reflector plate 40. The asymmetric light guide structure 211 of the present invention is consisted of at least one functional curve (i.e. for the shaping curve). A critical angle ($\theta c$) for the light ray able to across the interface of the light guide plate 20 and the atmosphere is determined by the refractive index of the material made of the light guide plate 20. By providing the shaping curve design for the asymmetric light guide structure 211, the incident angle of the light ray at the asymmetric light guide structure 211 would be larger than the critical angle ($\theta c$), and thus the total reflection can be achieved. As shown in FIG. 4, since $\theta c = \sin^{-1}(1/n)$, so the critical angle ($\theta c$) would be around 39.8° ~39.6° for the material of the light guide plate 20 to be the MS with a refractive index of about 1.56~1.57. In addition, in the case that the material of the light guide plate 20 is the PMMA with a refractive index of about 1.49, then the critical angle ($\theta c$) is about 42.2°. Further, in the case that the material of the light guide plate 20 is the PC with a refractive index of about 1.55, then the critical angle ($\theta c$) is about 40.2°. Furthermore, in the case that the material of the light guide plate 20 is the PS with a refractive index of about 1.58, then the critical angle ($\theta c$) is about 39.3°. Upon such an arrangement in shaping the asymmetric light guide structure 211, it is found that no significant light loss and light spots can be located on top of the asymmetric light guide structure 211 with different left and right concave structures. Also, the corresponding coupling efficiency would be improved, and most of the light rays would be propagated inside the light guide plate 20, so that the optical performance in the visible region 210 can be uniform and energy loss due to excessive total reflection can be reduced. Also, possible light emission of the total-reflected rays from the asymmetric light guide structure 211 can be avoided, and the ability to guide lights can be improved. The deflected light rays that hit the micro structures 221 would break the total reflection inside the light guide plate 20, and thus part of the light rays would leave the light guide plate 20 via crossing the light-ejection surface (the top surface 21). By varying the depth, density and diameter of the micro structures 221 mounted on the bottom surface 22 of the light guide plate 20, the uniformity in the entire visible region 210 can be optimal. In the present invention, the light-ejection surface (the top surface 21) of the light guide plate 20 are all visible region 210 except the area close to the asymmetric light guide structures 211.

In the present invention, an X-Y-Z orthogonal coordinate system is defined on the light guide plate 20. The Z direction is defined as the thickness direction of the light guide plate 20; namely, the direction from the bottom surface 22 to the top surface 21. The X direction and the Y direction are both extended over the bottom surface 22. in particularly, the X direction is parallel to the extending direction of the lateral side surface 231. Namely, these point-light sources 30 are evenly distributed in the extending direction of the lateral side surface 231 or in the X direction on the bottom surface 22 of the light guide plate 20 by closing to the lateral side surface (left lateral side 23).

Figure 5:
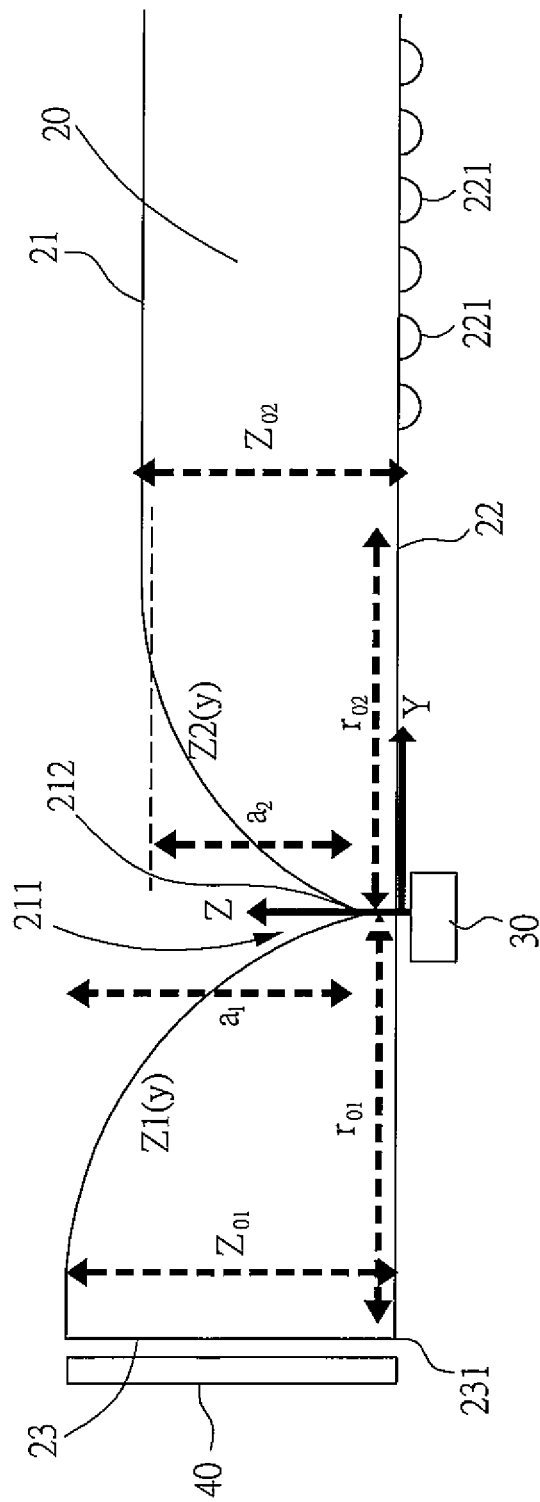
FIG. 5 demonstrates parameters and variables in the curve function for the asymmetric concave structure of the direct light guide structure in accordance with the present invention.

As shown in FIG. 4 and FIG. 5, in the present invention, each of the asymmetric concave structures 211 has a central lowest point 212 at a place corresponding to the point-light source 30 that is mounted right below the central lowest point 212. The central lowest point 212 is connected to the light-ejection surface (the top surface 21) by continuous configuration so as to form a cavity on the top surface 21 with the central lowest point 212 as the deepest point of the cavity. In FIG. 2, the cross sectional line A-A is defined on a Y-Z cutting plane crossing the central lowest point 212 of the asymmetric concave structure 211. The configuration of the asymmetric concave structure 211 on the cutting plane is clearly shown in FIG. 3 and FIG. 5, and can be expressed by the following equations.

$$Z1(y)=z01-a1*\exp(-|y|/t1), \text{ for } -r01<y<0; \quad \text{Equation 1:}$$

$$Z2(y)=z02-a2*\exp(-|y|/t2), \text{ for } 0<y<r02; \quad \text{Equation 2:}$$

In these two equations, z01 and z02 are the maximal thicknesses for the both bands of the cavity (i.e. the maximal thicknesses for the lateral portion and the main plate portion, respectively). It is shown in FIG. 5 that the main plate portion is in the +Y direction, while the lateral portion is in the −Y direction. The a1 and a2 are the maximal depths to the central lowest point 212 from tops of the lateral portion and the main plate portion, respectively. The t1 and t2 are the variables for the configurations of the asymmetric concave structure at the lateral portion and the main plate portion, respectively. The r01 and r02 are the radii of the cavity with respect to the Z axis passing the central lowest point 212 for the configurations of the asymmetric concave structure at the lateral portion and the main plate portion, respectively. The Z1(y) expressed as a thickness variable defines the configuration curve for the asymmetric concave structure 211 at the lateral portion, while the Z2(y) expressed also as a thickness variable defines the configuration curve for the asymmetric concave structure 211 at the main plate portion; in which y is a real number ranging between −r01 and r02.

In the preferred embodiment of the present invention, 0.7≤t1≤1.5, 0.7≤t2≤1.5, 3 mm≤z02<7 mm, 3.5 mm≤z01≤7 mm, 67%≤(a2/z02)<100% and z01>z02. It has been proved by several optical simulations with different parameter and/or variable combinations that the aforesaid Equation 1 and Equation 2 provided by the present invention with the aforesaid feasible ranges for parameters can propose the configuration curves for the asymmetric concave structure to achieve the optimal optical performance. Details thereabout would be elucidated as follows.

In the present invention, if each of the shaping curves (same as the configuration curves) for the individual asymmetric concave structure 211 is defined according to the Equation 1, the Equation 2 and the feasible parameter ranges, then the resulted cavity would have a light-loss percentage ≤10% with respect the point-light source 30. (Note that a smaller value in the light-loss percentage is better.)

In the following description, several examples with different parameter combination within the feasible parameter ranges are raised to demonstrate the advantage of the aforesaid Equation 1 and Equation 2 in designing the shaping curves (the configuration curves) for the asymmetric concave structure 211 of the present invention, especially for the advantages in the light-loss percentage.

Figure 6A:
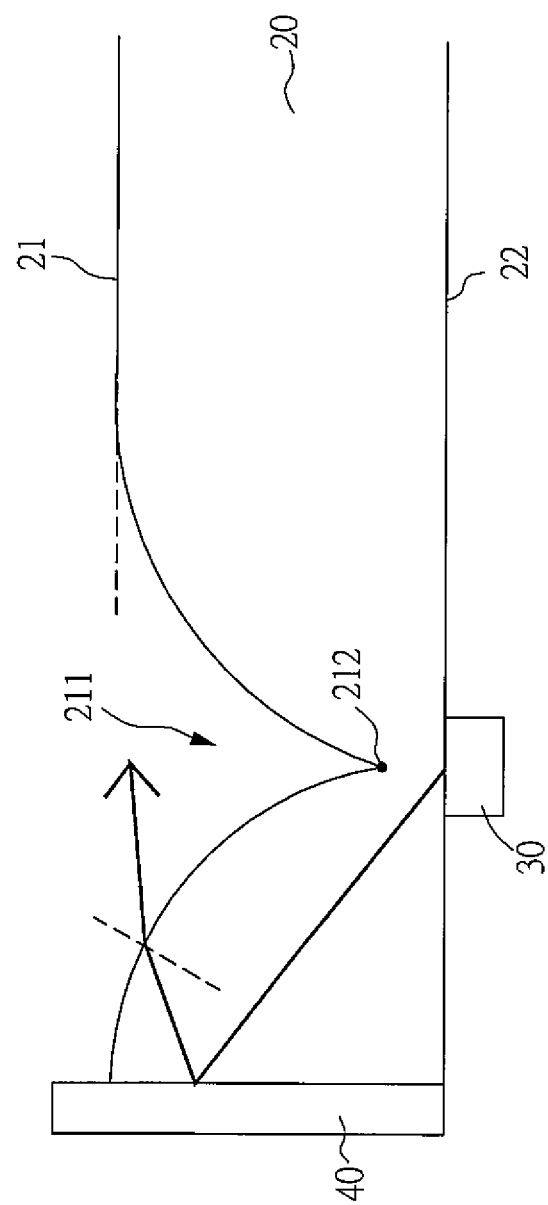
FIG. 6A is a schematic view of a light ray path for the situation of z01=z02 for the concave structure in accordance with the present invention.

Referring now to FIG. 6A, a schematic view of a light ray path for the situation of z01=z02 for the asymmetric concave structure 211 in accordance with the present invention is shown. In the figure, in the case of z01=z02 for the asymmetric concave structure 211, the left-hand-side configuration curve (the lateral portion in the −Y direction) and the right-hand-side configuration curve (the main plate portion in the +Y direction) would be the same. At this time, the light ray emitted by the point-light source 30 would irradiate the reflector plate 40 directly, and then would be reflected by the reflector plate 40 (defined as a lateral deflected light ray). The lateral deflected light ray would be easier to cross the left-hand-side configuration curve of the asymmetric concave structure 211 so as to form a light-loss phenomenon. In this example, the light-loss percentage is relative high, and the optical performance is poor. Thus, the asymmetric curve design for achieving the asymmetric concave structure 211 of the present invention can provide better optical paths and better incident angles so as to improve the symmetric concave structure in light-loss percentage.

Referring now to FIG. 6B, a schematic view of a light ray path for the situation of z01>z02 for the asymmetric concave structure 211 in accordance with the present invention is shown. In the figure, in the case of z01>z02 for the asymmetric concave structure 211, the left-hand-side configuration curve (the lateral portion in the −Y direction) and the right-hand-side configuration curve (the main plate portion in the +Y direction) are shown to present the "asymmetric" concave structure. At this time, the light ray emitted by the point-light source 30 would irradiate the reflector plate 40 directly, and then would be reflected by the reflector plate 40 (defined as a lateral deflected light ray R1'). The incident angle for the R1' at point (y3,Z(y3)) would meet the following mathematical equation.

$$90°-\phi^2-\phi^1=90°-\tan^{-1}(Z(y^3)/y^3)-\tan^{-1}(1/Z'(y^3))>\sin^{-1}(1/n)$$

In the present invention, the left-hand-side configuration curve at the lateral portion of asymmetric concave structure 211 shall satisfy the requirement that the reflected light ray from the reflector plate 40 at the lateral side 23 of the light guide plate 20 would meet a total reflection at the configuration curve for the asymmetric concave structure 211 in the lateral portion of the light guide plate 20. Namely, the aforesaid $1^{st}$-order geometric optical relationship shall be satisfied. That is the incident angle of the light ray at the configuration curve of the asymmetric concave structure 211 in the lateral portion of the light guide plate 20 should be larger than the critical angle.

Figure 7:
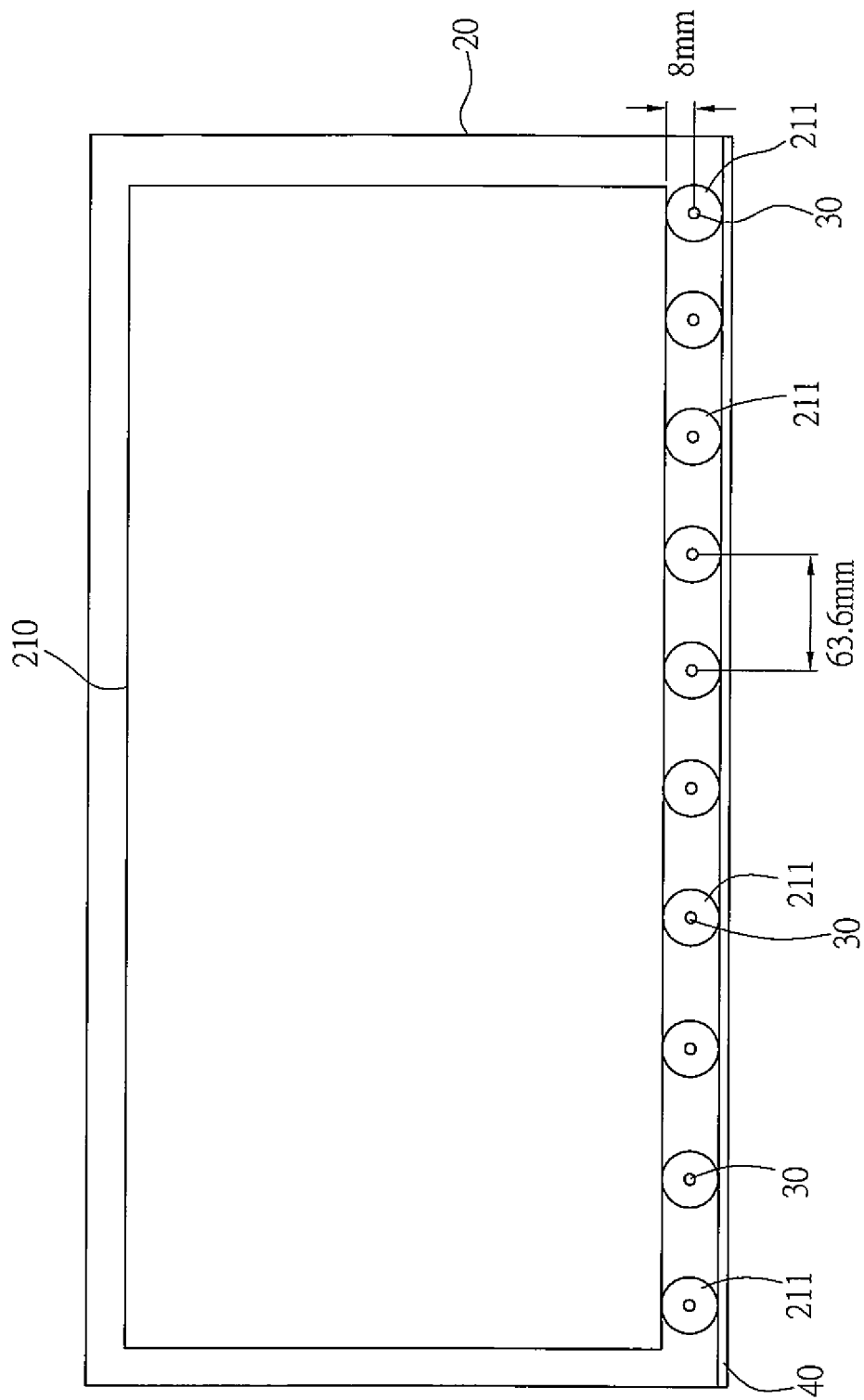
FIG. 7 is a schematic view of a 32" back-light display panel having the direct light guide structure in accordance with the present invention.

Referring now to FIG. 7, a schematic view of a 32" back-light display panel having the direct light guide structure in accordance with the present invention is shown. The direct light guide structure is applied to a 32" back-light display panel. By having this 32" LCD panel as an example of the back-lit module, according to the technique of the direct light guide structure disclosed in this present invention, only 10 pieces of the high-power LEDs are needed, and the A/P ratio=8/63.6=0.126. Hence, the necessary width of the side frame for providing satisfied optical performance can be comparatively smaller. On the other hand, the 32" back-lit module of the edge back-lit light guide plate would require more high-power LEDs to achieve the same optical performance. Generally speaking, by having the same illumination performance of a 32" back-lit module, the direct light guide structure according to the present invention would need only ⅙~⅔ of the high-power LEDs than the conventional edge light guide structure. In addition, the phenomenon of light spots (or hot spots) can be significantly reduced by applying the present invention, also the width of the side frame can be made smaller, the A/P ratio would be extremely small, the thickness would be reduced to a thin scale, and the optical performance in the direct visible region would be homogeneous.

Figure 8A:
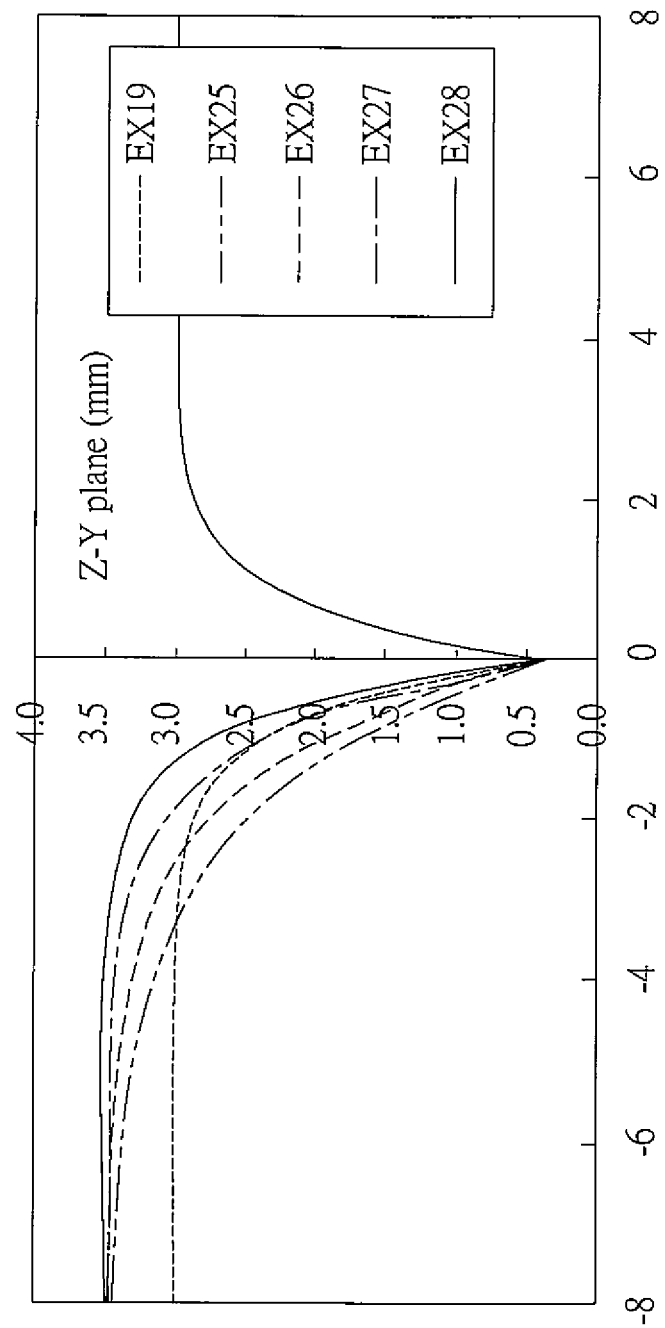
FIG. 8A, FIG. 8B and FIG. 8C demonstrate respectively the configuration curves of the asymmetric concave structure, the incident angles of non-optical axial rays and the incident angle of lateral reflected rays for the direct light guide structure of the present invention by applying parameters of Table 1 to Equation 1 and Equation 2.
Figure 8B:
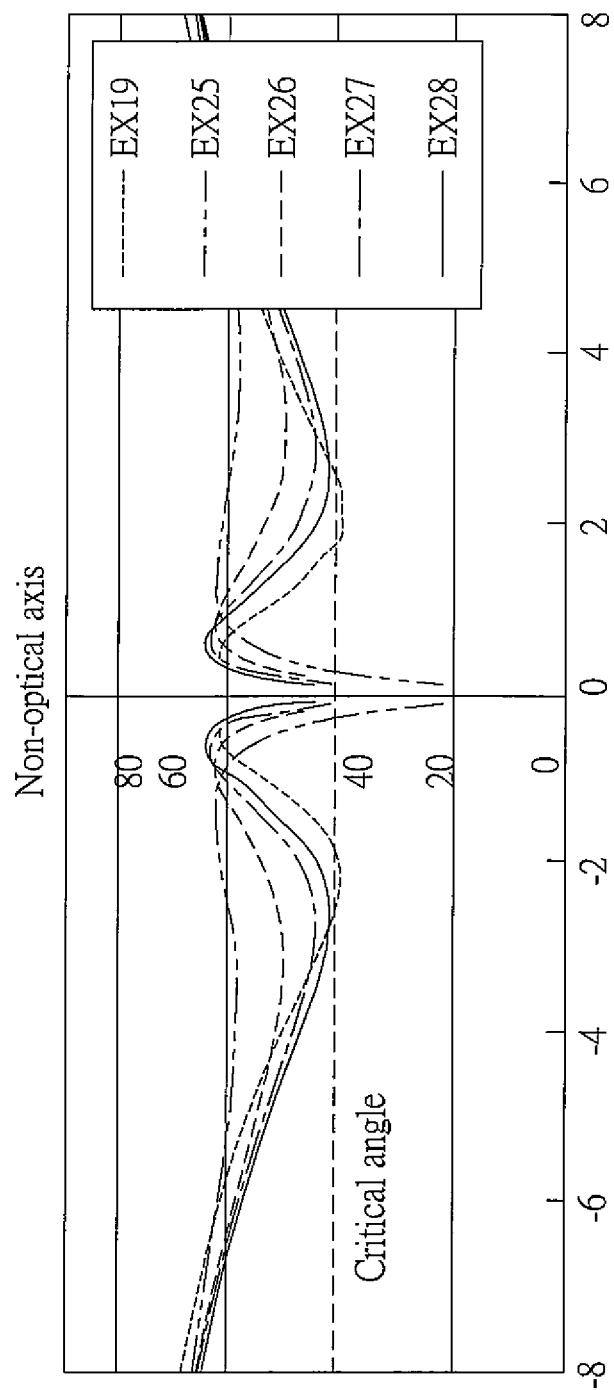
Figure 8C:
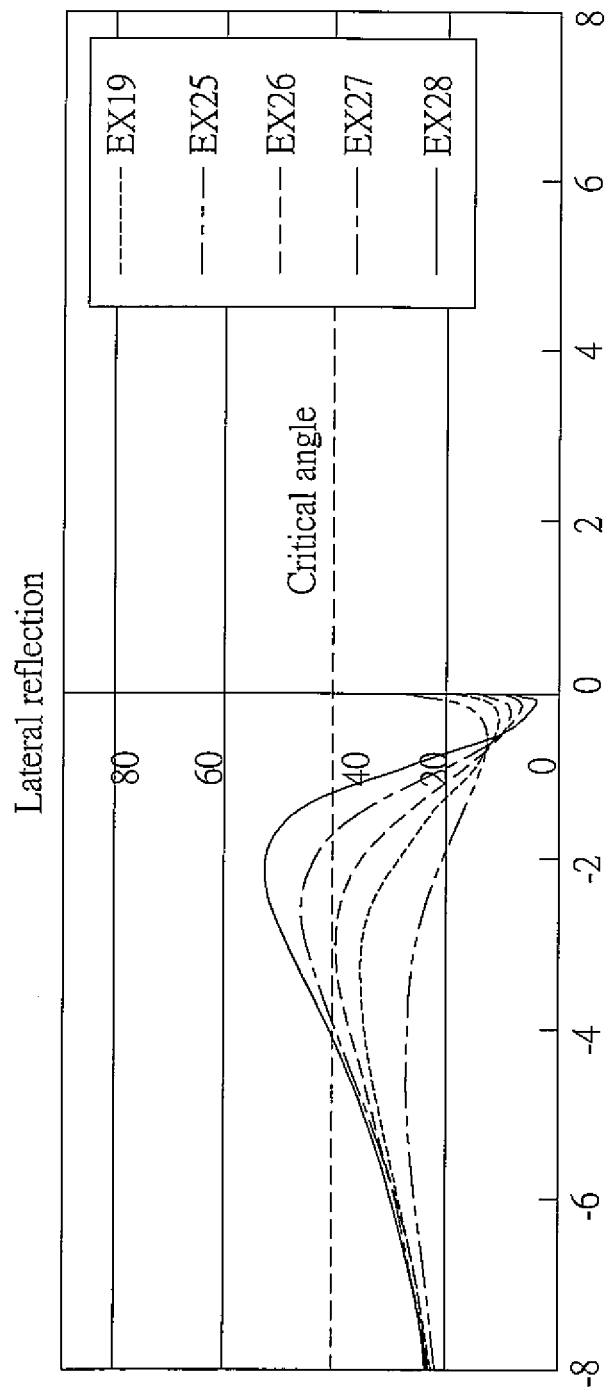

Referring now to FIG. 8A, FIG. 8B and FIG. 8C, the configuration curves of the asymmetric concave structure, the incident angles of non-optical axial rays and the incident angle of lateral reflected rays for the direct light guide structure of the present invention by applying parameters of Table 1 to Equation 1 and Equation 2 are shown, respectively.

In Table 1, the column of predicted incident angle indicates whether the incident angle of the emitted light ray toward the light guide plate 20, from the point-light source 30, at the curved configuration of the concave structure 211 on the top surface of the light guide plate 20 in the +Y main plate portion is greater than the critical angle θc or not. (For example, the critical angle (θc) would be about 40.2° for the light guide plate 20 made of the PC material having a refractive index of about 1.55.) In this column, "O" implies that the incident angle is larger than the critical angle, and thus total reflection would occur. On the other hand, "X" in this column implies that the incident angle is smaller than the critical angle, and thus light-loss phenomenon would occur. Further, the column "predicted lateral-reflected incident angle" indicates whether the incident angle of the reflected light ray toward the light guide plate 20, from the reflector plate 40, at the curved configuration of the concave structure 211 on the top surface of the light guide plate 20 in the −Y lateral portion is greater than the critical angle θc or not. Similarly, in this "predicted lateral-reflected incident angle" column, "O" implies that the incident angle is larger than the critical angle, and thus total reflection would occur. On the other hand, "X" in this column implies that the incident angle is smaller than the critical angle, and thus

TABLE 1

Parameters, derived light-loss percentages and predicted incident angles for Embodiments with the first parameter combination

| | maximal thickness z01 | maximal depth a1 | curve variable t1 | predicted incident angle | predicted lateral-reflected incident angle | maximal thickness z02 | maximal depth a2 | curve variable t2 | light-loss percentage % |
|---|---|---|---|---|---|---|---|---|---|
| Ex19 | 3 | 2.7 | 0.7 | O | X | 3 | 2.7 | 0.7 | 8.7 |
| Ex25 | 3.5 | 3.15 | 1.8 | X | X | 3 | 2.7 | 0.7 | 7.7 |
| Ex26 | 3.5 | 3.15 | 1.5 | O | X | 3 | 2.7 | 0.7 | 6.5 |
| Ex27 | 3.5 | 3.15 | 1.0 | O | O | 3 | 2.7 | 0.7 | 5.1 |
| Ex28 | 3.5 | 3.15 | 0.7 | O | O | 3 | 2.7 | 0.7 | 5.7 |

In Table 1 through Table 6, Ex01~Ex12, Ex19, Ex25~Ex36 stand for embodiments numbered by the tailing numbers, in which z01=z02 in Ex19 implies a symmetric concave structure that the thicknesses of the light guide plate and the configuration curves for the left-hand-side of the concave structure 211 (−Y, lateral portion) and for the right-hand-side of the concave structure 211 (+Y, main plate portion) are the same. This embodiment can be a basic reference (i.e. the control experiment) for the other embodiments in comparing the light-loss percentage. In Table 1, by plugging z01, t1, a1, z02, t2 and a2 of each embodiment into Equation 1 and Equation 2, then the configuration curves of the concave structure 211 of the light guide plate 20 for the −Y lateral portion and the +Y main plate portion (referred to FIG. 5) can be derived. The respective configuration curves for Table 1 are plotted in FIG. 8A. As long as the configuration curves as shown in FIG. 8A are obtained for the concave structure 211 in the A-A cross section, the curved configurations for the other cross sections of the concave structure 211 can be derived by proportional increments to the curved configuration at A-A cross section. Thus, the entire cavity of the concave structure 211 on the top surface of the light guide plate 20 can be obtained. As shown in FIG. 4, the maximal thicknesses of the concave structure 211 at the B-B cross section in the +X and −X directions would be both equal to (z01+z02)/2, and the rest may be inferred by analogy.

light-loss phenomenon would occur. The column "light-loss percentage %" in Table 1 is the ratio of the light rays that cross the curved configurations of the concave structure 211 to the total light rays emitted upward by the point-light source 30, by computer simulations.

From Table 1, it is noted that, as z01>z02, each of the light-loss percentages for Ex25, Ex26, Ex27, Ex28 is significantly smaller than the light-loss percentage for Ex19 (z01=z02), no matter how the curve variable t1 is. Apparently, in the asymmetric concave structure 211 (z01>z02), for an example of z02=3 mm and z01≥3.5 mm, a smaller (and thus better) light-loss percentage than that of the "symmetric" concave structure can be obtained. However, even for z01>z02, if t1≥1.5, then an "X" (standing for less qualified) would appear to the corresponding "predicted incident angle" column and/or the "predicted lateral-reflected incident angle" column. Hence, t1 ought to be preferably ranged between 0.7 and 1.4, i.e. 0.7≤t1≤1.4.

Figure 9A:
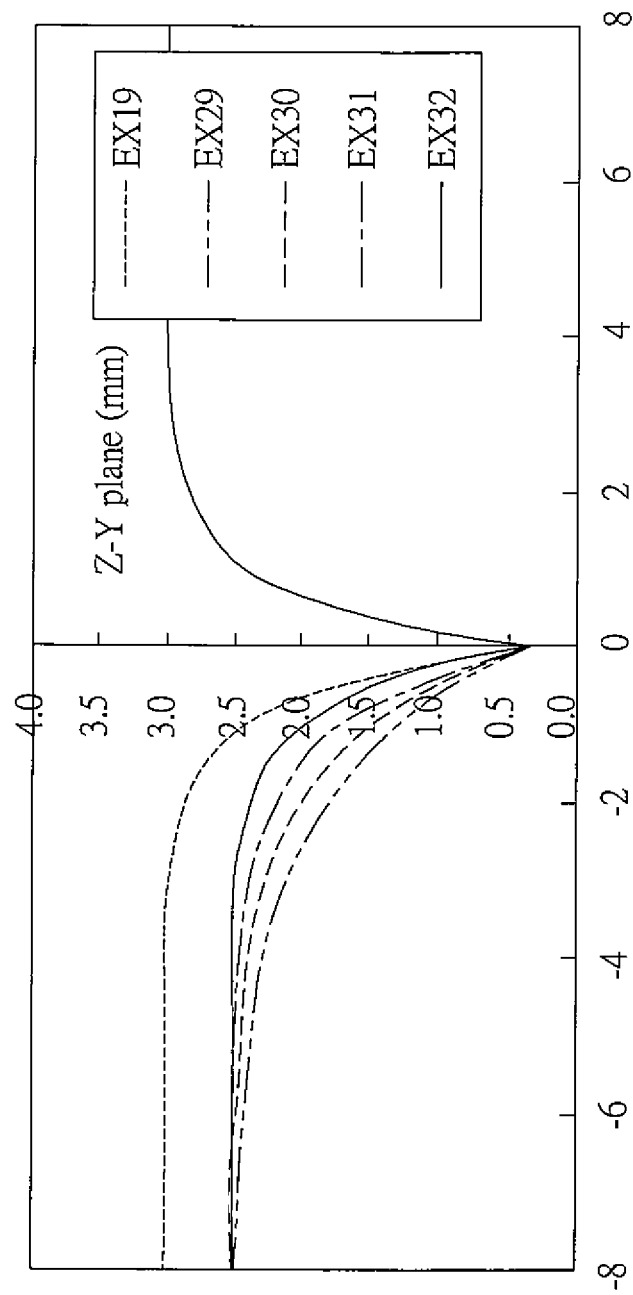
FIG. 9A, FIG. 9B and FIG. 9C demonstrate respectively the configuration curves of the asymmetric concave structure, the incident angles of non-optical axial rays and the incident angle of lateral reflected rays for the direct light guide structure of the present invention by applying parameters of Table 2 to Equation 1 and Equation 2.
Figure 9B:
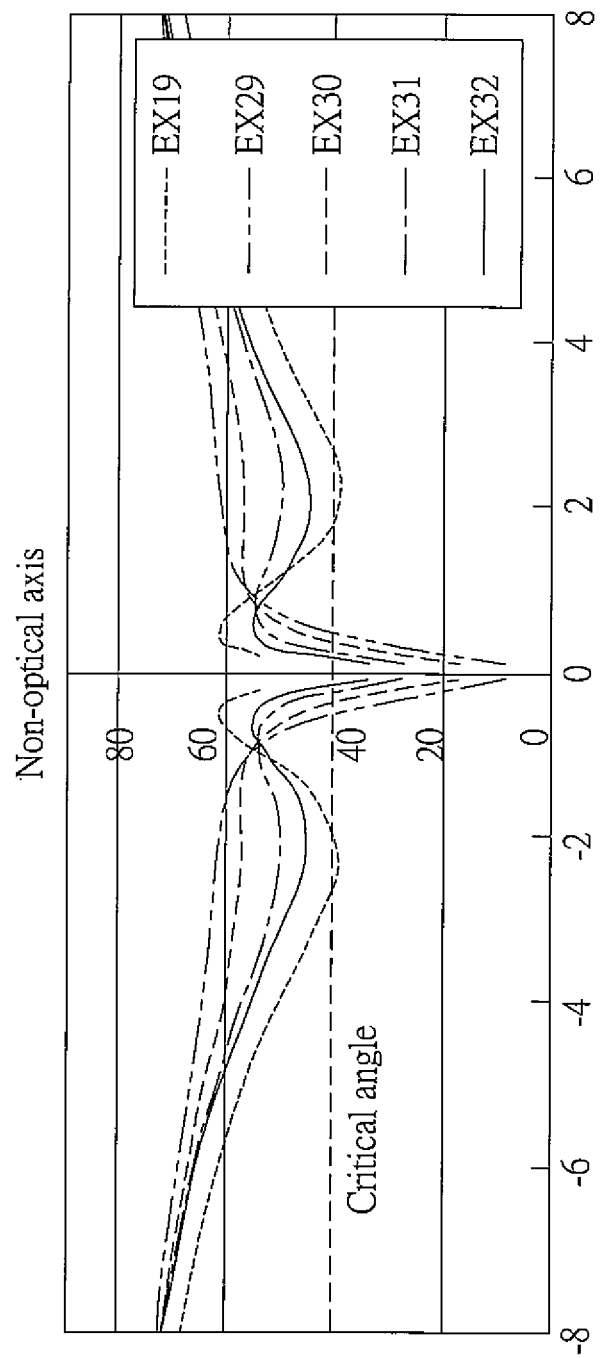
Figure 9C:
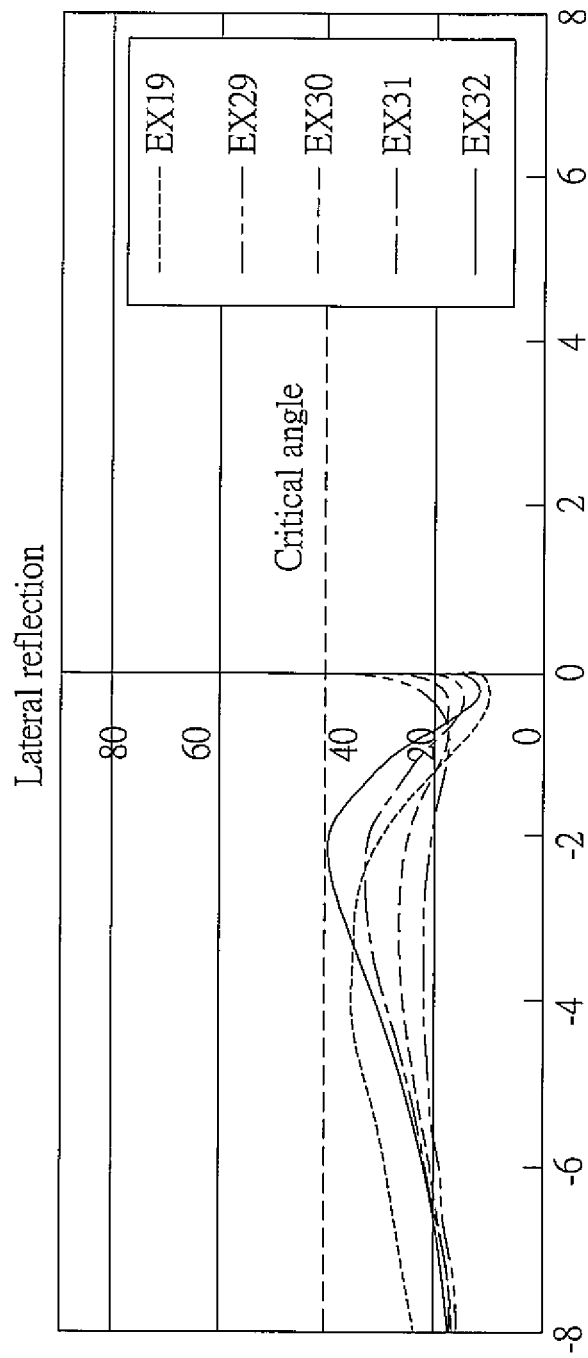

Referring now to FIG. 9A, FIG. 9B and FIG. 9C, the configuration curves of the asymmetric concave structure, the incident angles of non-optical axial rays and the incident angle of lateral reflected rays for the direct light guide structure of the present invention by applying parameters of Table 2 to Equation 1 and Equation 2 are shown, respectively.

TABLE 2

Parameters, derived light-loss percentages and predicted incident
angles for Embodiments with the second parameter combination

| | maximal thickness z01 | maximal depth a1 | curve variable t1 | predicted incident angle | predicted lateral-reflected incident angle | maximal thickness z02 | maximal depth a2 | curve variable t2 | light-loss percentage % |
|---|---|---|---|---|---|---|---|---|---|
| Ex19 | 3 | 2.7 | 0.7 | ○ | X | 3 | 2.7 | 0.7 | 8.7 |
| Ex29 | 2.5 | 2.25 | 1.8 | X | X | 3 | 2.7 | 0.7 | 33.3 |
| Ex30 | 2.5 | 2.25 | 1.5 | X | X | 3 | 2.7 | 0.7 | 37.4 |
| Ex31 | 2.5 | 2.25 | 1.0 | X | X | 3 | 2.7 | 0.7 | 43 |
| Ex32 | 2.5 | 2.25 | 0.7 | X | X | 3 | 2.7 | 0.7 | 47.1 |

In Table 2, as z01<z02, the light-loss percentages for Ex29, Ex30, Ex31, Ex32 are all significantly larger than that of Ex19, and "X"s are shown to all columns of "predicted incident angle" and "predicted lateral-reflected incident angle". Hence, as z01<z02, the optical performance is poor.

Figure 10A:
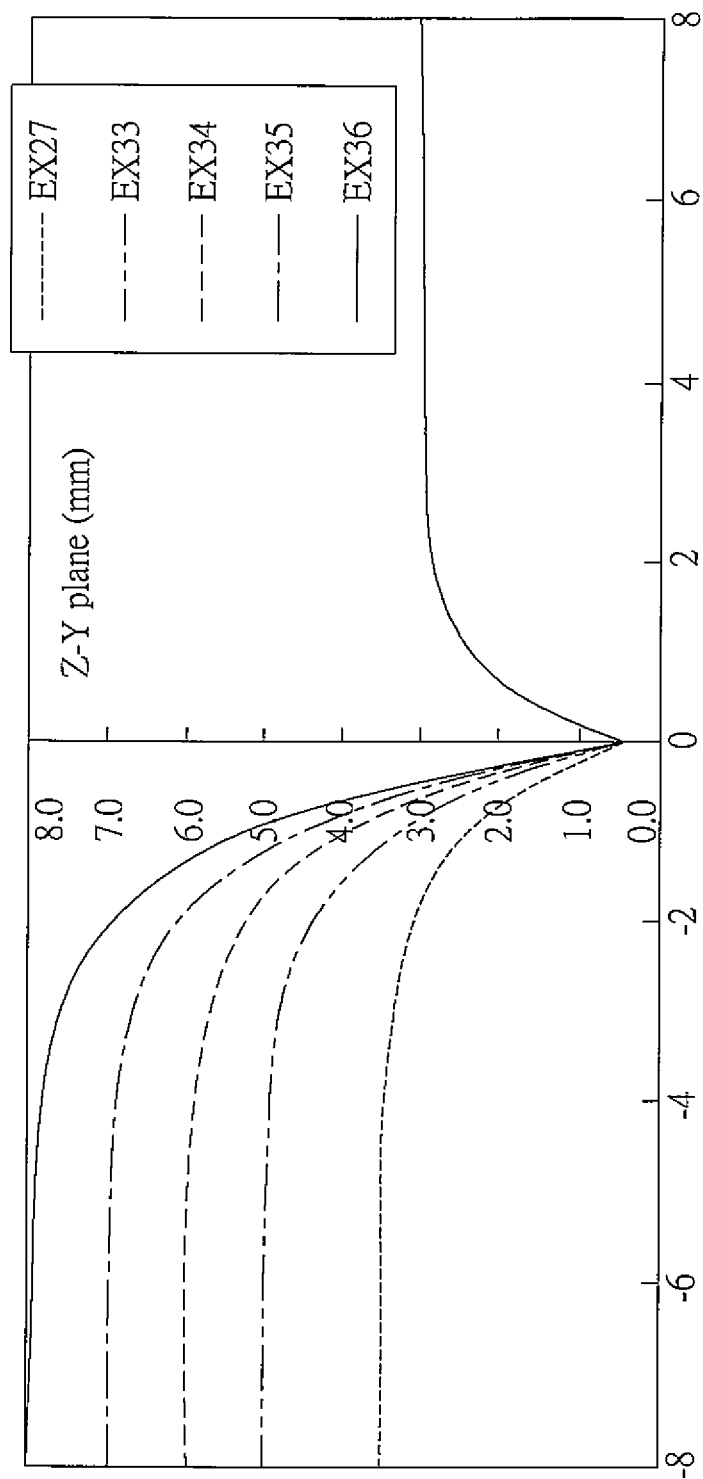
FIG. 10A, FIG. 10B and FIG. 10C demonstrate respectively the configuration curves of the asymmetric concave structure, the incident angles of non-optical axial rays and the incident angle of lateral reflected rays for the direct light guide structure of the present invention by applying parameters of Table 3 to Equation 1 and Equation 2.
Figure 10B:
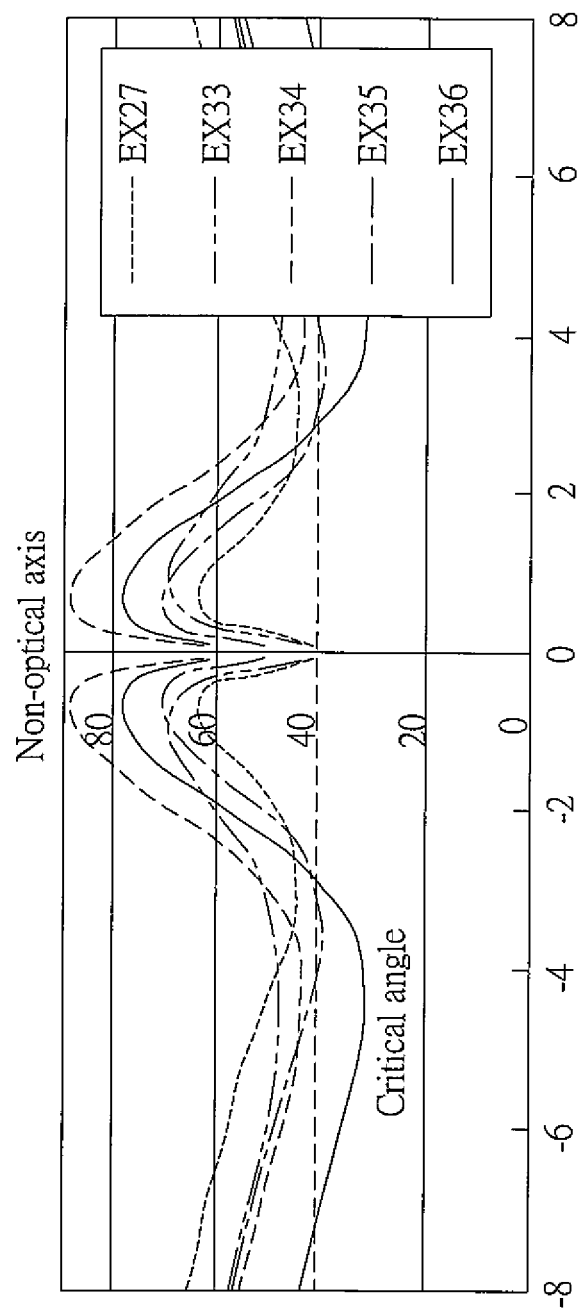
Figure 10C:
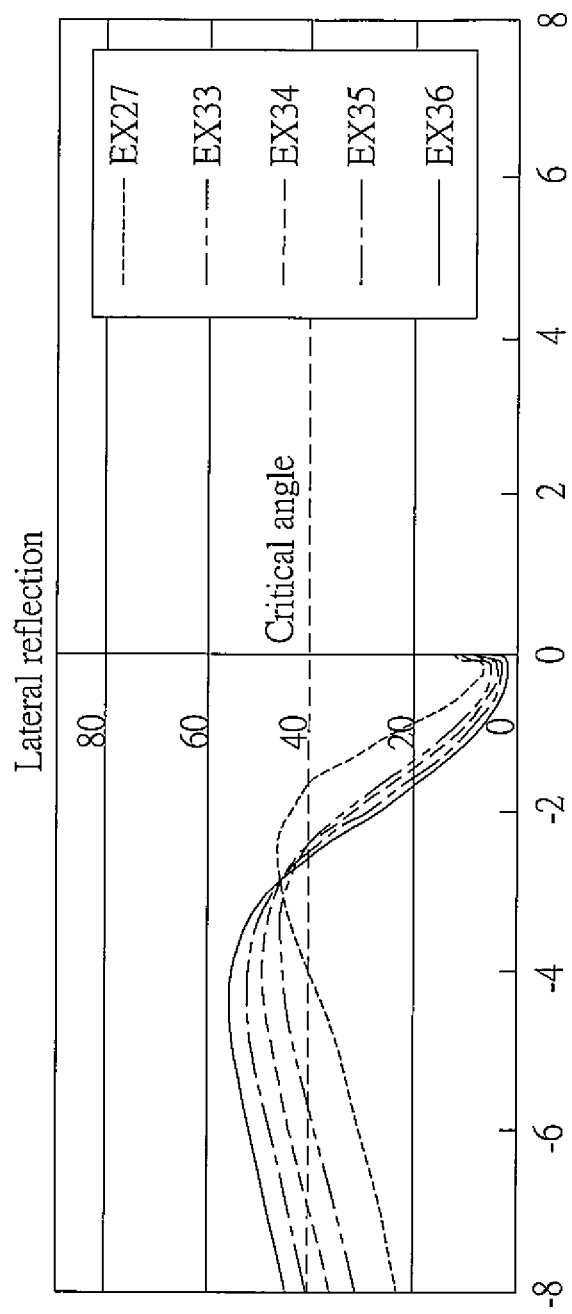

Referring now to FIG. 10A, FIG. 10B and FIG. 10C, the configuration curves of the asymmetric concave structure, the incident angles of non-optical axial rays and the incident angle of lateral reflected rays for the direct light guide structure of the present invention by applying parameters of Table 3 to Equation 1 and Equation 2 are shown, respectively.

TABLE 3

Parameters, derived light-loss percentages and predicted incident
angles for Embodiments with the third parameter combination

| | maximal thickness z01 | maximal depth a1 | curve variable t1 | predicted incident angle | predicted lateral-reflected incident angle | maximal thickness z02 | maximal depth a2 | curve variable t2 | light-loss percentage % |
|---|---|---|---|---|---|---|---|---|---|
| Ex27 | 3.5 | 3.15 | 1.0 | ○ | ○ | 3 | 2.7 | 0.7 | 5.1 |
| Ex33 | 5 | 4.7 | 1.0 | ○ | ○ | 3 | 2.7 | 0.7 | 4.8 |
| Ex34 | 6 | 5.7 | 1.0 | ○ | ○ | 3 | 2.7 | 0.7 | 4.5 |
| Ex35 | 7 | 6.7 | 1.0 | ○ | ○ | 3 | 2.7 | 0.7 | 3.7 |
| Ex36 | 8 | 7.7 | 1.0 | X | ○ | 3 | 2.7 | 0.7 | 23.7 |

In Table 3, by having Ex27 as the control experiment, as z01 is gradually increased to 7.7 mm (over 7 mm), then the corresponding light-loss percentage is significantly increased to 23.7%, and the "predicted incident angle" column is filled with an unqualified "X". Hence, as z01>7 mm, the optical performance is poor. Thus, in the present invention, 3.5 mm≤z01≤7 mm is preferable.

In the aforesaid embodiments of the direct back-lit light guide plate in accordance with the present invention, the asymmetric concave structure of the direct light guide structure is located on the top surface of the light guide plate and shaped as an asymmetric cavity. The curvatures of the shaping curves, the radii of the opening and the thicknesses of the asymmetric concave structure in the −Y lateral portion and in the +Y main plate portion are all non-identical. Upon such an arrangement, better optical performance can be provided over the conventional design. The asymmetric concave structure of the direct light guide structure is consisted of at least one functional curve (for example, Equation 1 and Equation 2). Preferably, the asymmetric concave structure is formed by connecting curves with continuous-varying curvatures. According to the present invention, while the light ray of the point-light source hits the asymmetric concave structure, the corresponding incident angle would be larger than the critical angle, so that the light ray would experience at least one total reflection by the asymmetric concave structure without directly crossing the asymmetric concave structure. Thereby, the light ray inside the light guide plate would be efficiently propagated to the far ends thereinside, such that light loss or light spots over the asymmetric concave structure would be substantially avoided. Also, the coupling efficiency would be improved. In the present invention, the top surface and the bottom surface of the light guide plate are largely parallel to each other. The top surface and/or the bottom surface of the light guide plate may include a plurality of concave or convex micro structures. By adjusting the density and the shape of these micro structures, an optimal optical performance can be obtained. For example, the micro structures can be arranged in a radiation manner having a smaller density and a narrower region close to the asymmetric concave structure and a larger density and a broader region far away the asymmetric concave structure, such that uniformity in optical performance can be obtained. In the present invention, the micro structure can be shaped as a line segment, a point; or any regular or irregular-shaped convex or concave structure. Alternatively, the micro structures can be paints printed on the top surface and/or the bottom surface of the light guide plate.

Figure 11:
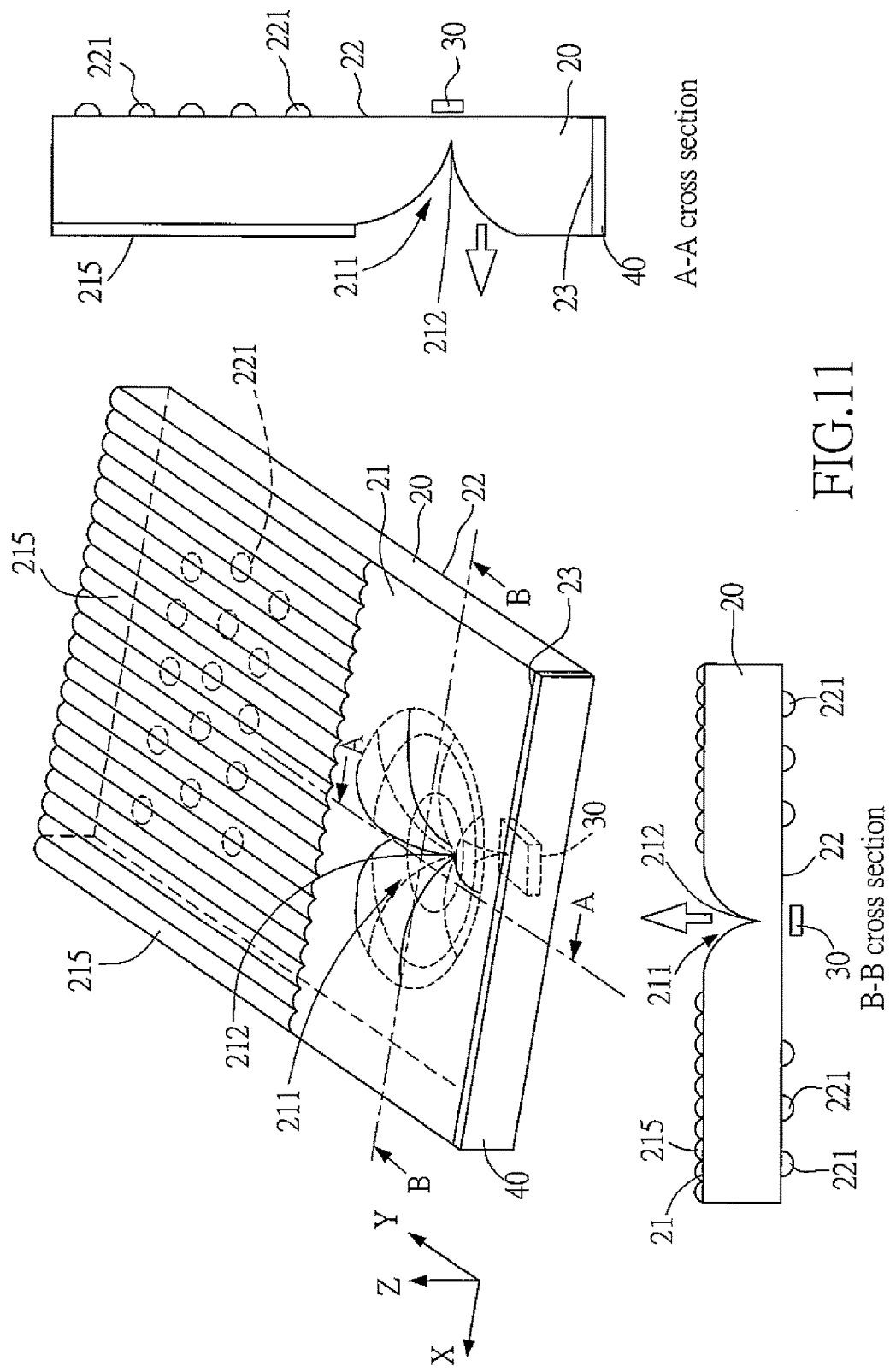
FIG. 11 demonstrates schematically three views upon another light guide structure of the direct back-lit light guide plate in accordance with the present invention, in an enlarged perspective view, a cross sectional view along line A-A and a cross sectional view along line B-B.

FIG. 11 demonstrates schematically three views upon another light guide structure of the direct back-lit light guide plate in accordance with the present invention, in an enlarged perspective view, a cross sectional view along line A-A and a cross sectional view along line B-B. In this embodiment, except for the aforesaid convex or concave round point-shaped micro structures 221 on the bottom surface, the top surface (i.e. the light-ejection surface) of the light guide plate can further include a plurality of protrusive slender micro structures 215. In this embodiment, these slender micro structures 215 are extended in a direction perpendicular to the extending direction of the reflector plate 40, and these round point-shaped micro structures 221 and these slender micro structures 215 are all located on the light guide plate at respective places without the asymmetric concave structures 211 or the point-light source 30. Namely, these micro structures 221 and 215 are constructed only in the visible region.

Figure 12A:
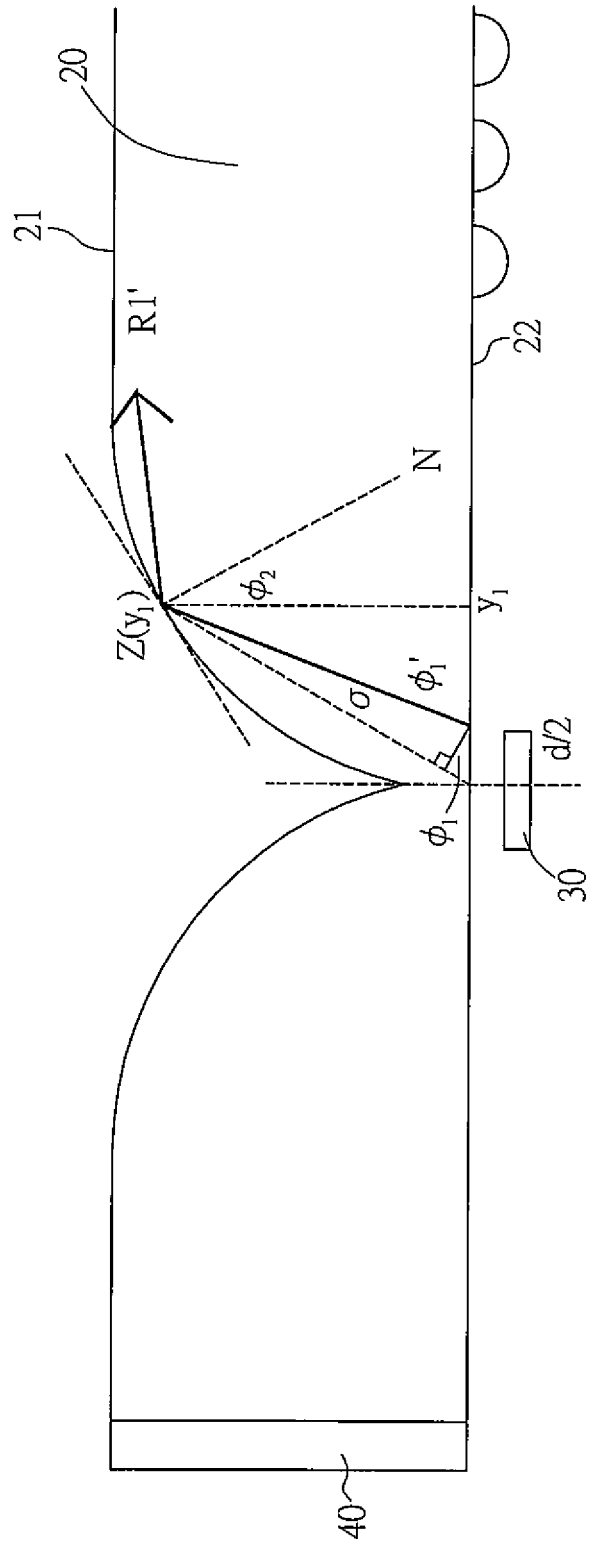
FIG. 12A and FIG. 12B demonstrate schematically two different light ray paths in the non-optical axial state with respect to the direct light guide structure of the present invention.
Figure 12B:
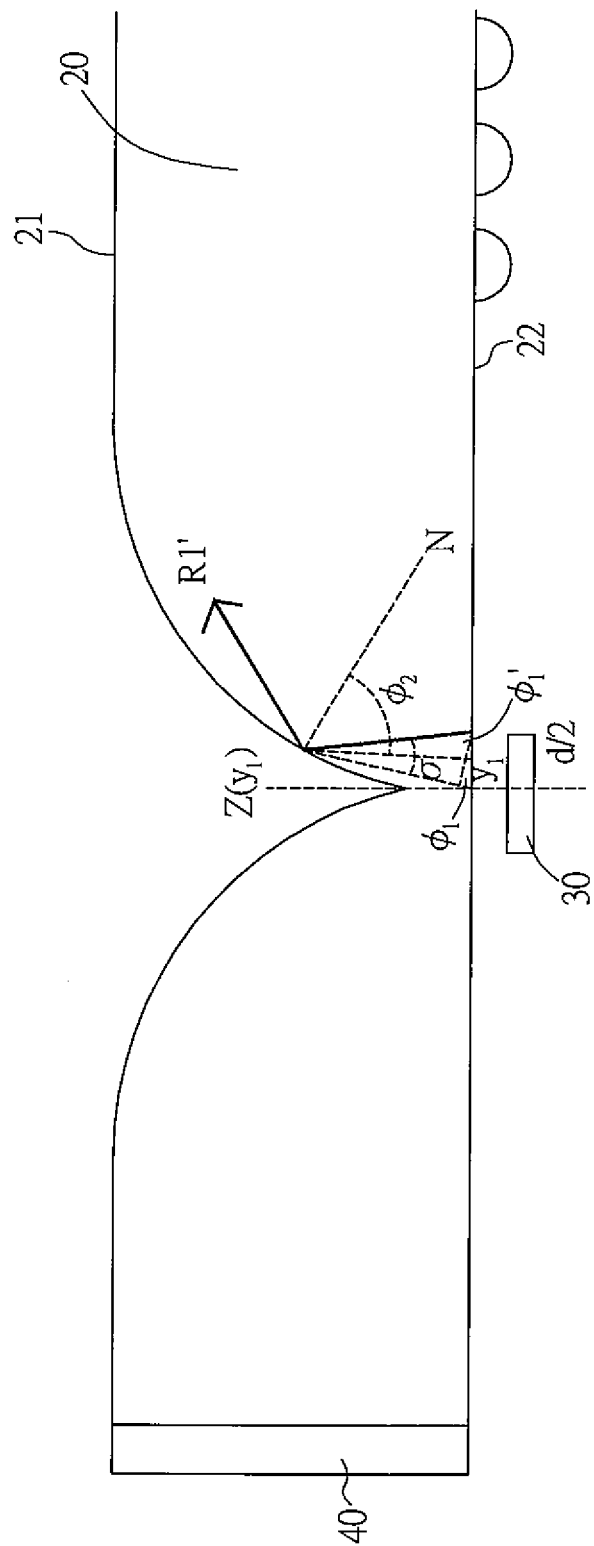

Referring now to FIG. 12A and FIG. 12B, two different light ray paths in the non-optical axial state with respect to the direct light guide structure of the present invention are schematically shown, respectively. Ideally, the point-light source 30 of the present invention shall be a volume-less point light source. However, in reality, the point-light source 30 is precise an LED light source with a diameter (or lateral-side length) ranging about 1~2 mm. Therefore, the light rays emitted by the point-light source 30 are not all originated and radiate from the center point of the point-light source 30, but are actually originated and radiate from the entire point-light source 30 with a substantial volume. Theoretically, the light rays emitted from the point-light source 30 other than the center point thereof belong to the non-optical axial optics. As shown in FIG. 12A, for the light ray emitted from the right end of the point-light source 30 and propagating in the +Y direction to hit the curved configuration of the concave structure in the +Y main plate portion, if the total reflection is desired, the following mathematical equation shall be met.

The incident angle of the light ray R1' at the point (y1,Z(y1)) shall meet:

$$90°-\phi'_1+\phi_2=90°-(\phi_1+\sigma)+\phi_2=180°-\tan^{-1}(Z(y_1)/y_1)-\tan^{-1}(1/Z'(y_1))-\sigma>\sin^{-1}(1/n)$$

in which $\phi'_1=\tan^{-1}(Z(y_1)/(y_1-d/2))$, and $\sigma=\phi'_1-\phi_1$.

As shown in FIG. 12B, for the light ray emitted from the right end of the point-light source 30 and propagating in the −Y direction to hit the curved configuration of the concave structure in the +Y main plate portion, if the total reflection is desired, the following mathematical equation shall be met.

$$\phi_2-(90°-\phi'_1)=-90°+\phi'_1+\phi_2>\sin^{-1}(1/n)$$

Figure 12C:
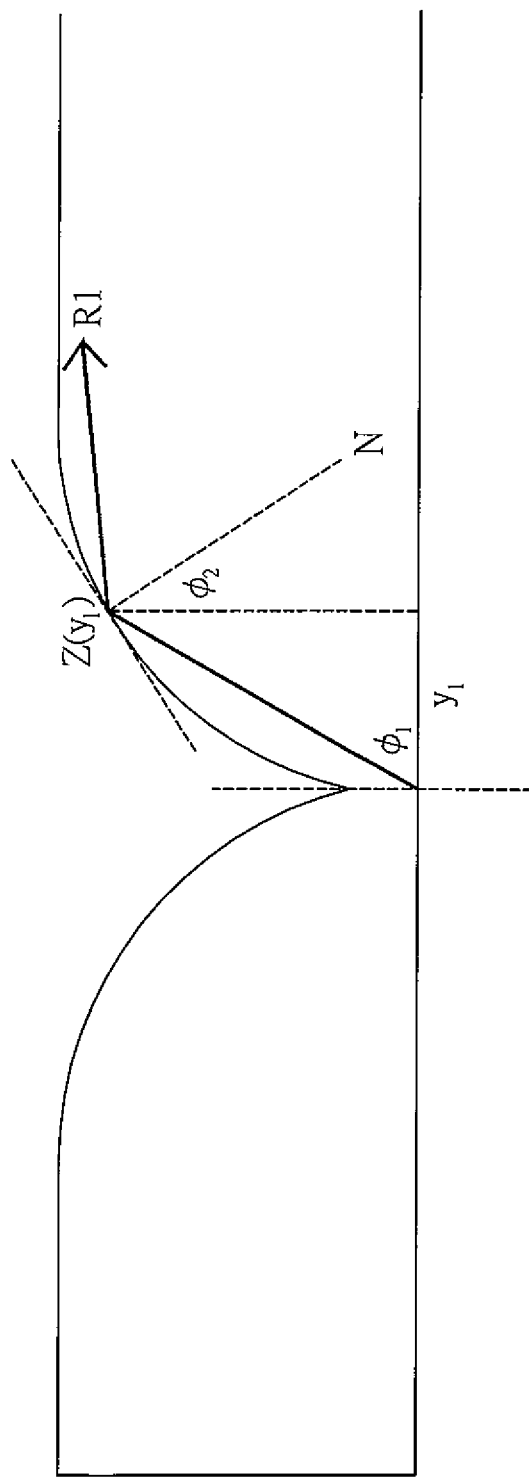
FIG. 12C demonstrates schematically a light ray path in the optical axial state with respect to the direct light guide structure of the present invention.

Referring now to FIG. 12C, a light ray path in the optical axial state with respect to the direct light guide structure of the present invention is schematically demonstrated. By comparing to the point-light source in the non-optical axial optics, the point-light source in FIG. 12C is assumed to be volume-less, and the light rays can only be emitted and radiate from the center point of the point-light source 30. At this time, the optical axial optics prevails. As shown in FIG. 12C, for the light ray emitted from the center point of the point-light source 30 to hit the curved configuration of the concave structure in the +Y main plate portion, if the total reflection is desired, the following mathematical equation shall be met.

The incident angle of the light ray R1 at the point (y1,Z(y1)) shall meet:

$$90°-\phi_1+\phi_2=180°-\tan^{-1}(Z(y_1)/y_1)-\tan^{-1}(1/Z'(y_1))>\sin^{-1}(1/n)$$

in which $\phi_1=\tan^{-1}(Z(y_1)/y_1)$ and $\phi_2=90°-\tan^{-1}(1/Z'(y_1))$.

In the present invention, the configuration curve design shall fulfill the total reflection criteria while the emitted light ray of the point light source hits the surface of the light guide plate. The corresponding equations satisfy the above first order geometric optical relationship, i.e. the incident angle of the light ray R1 on the main plate portion shall be larger than the critical angle.

Figure 14A:
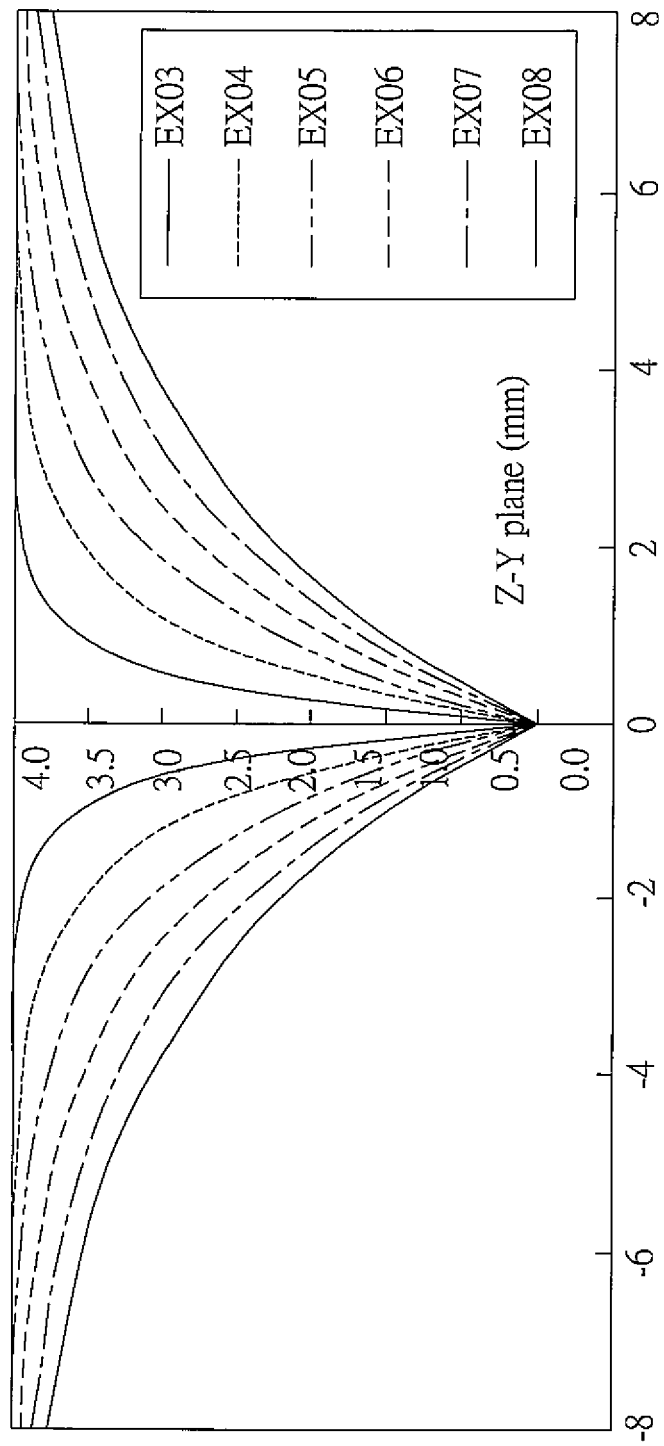
FIG. 14A, FIG. 14B and FIG. 14C demonstrate respectively the configuration curves of the asymmetric concave structure, the incident angles of non-optical axial rays and the incident angle of lateral reflected rays for the direct light guide structure of the present invention by applying parameters of Table 4 to Equation 3.
Figure 14B:
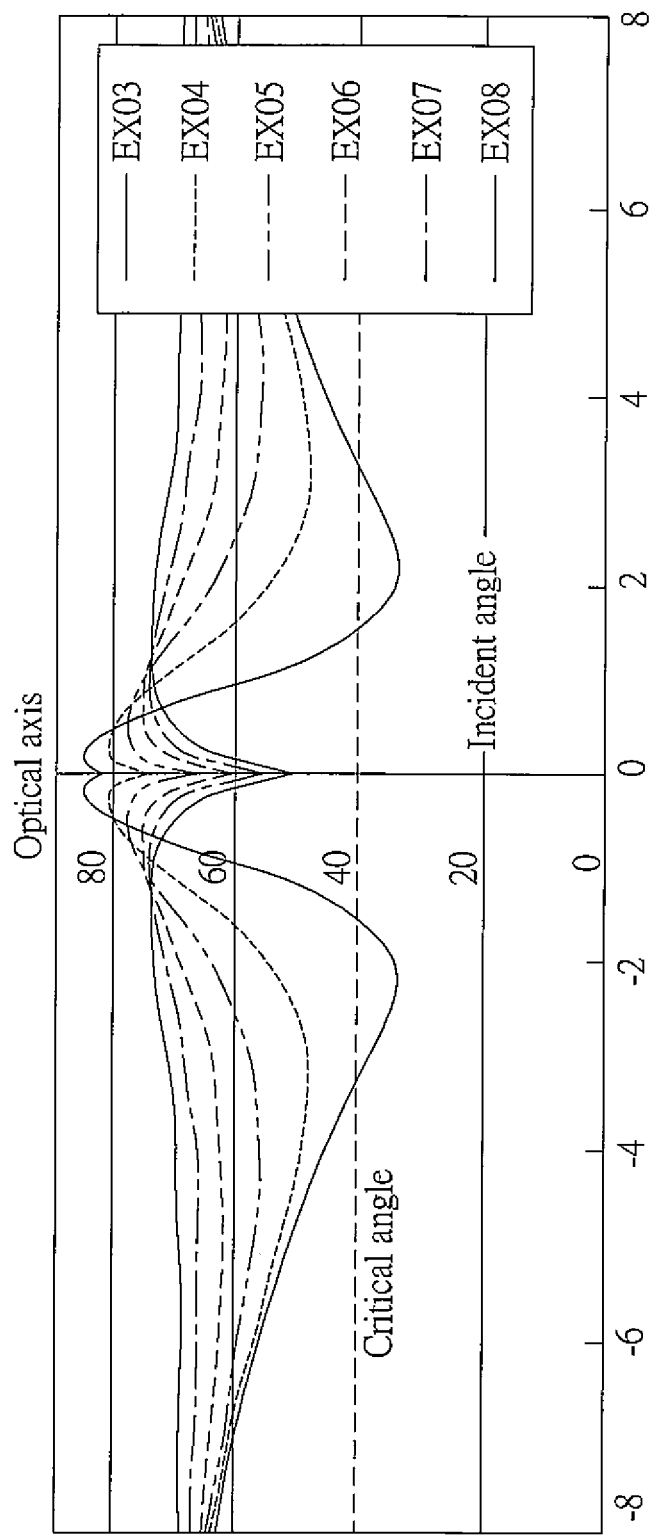
Figure 14C:
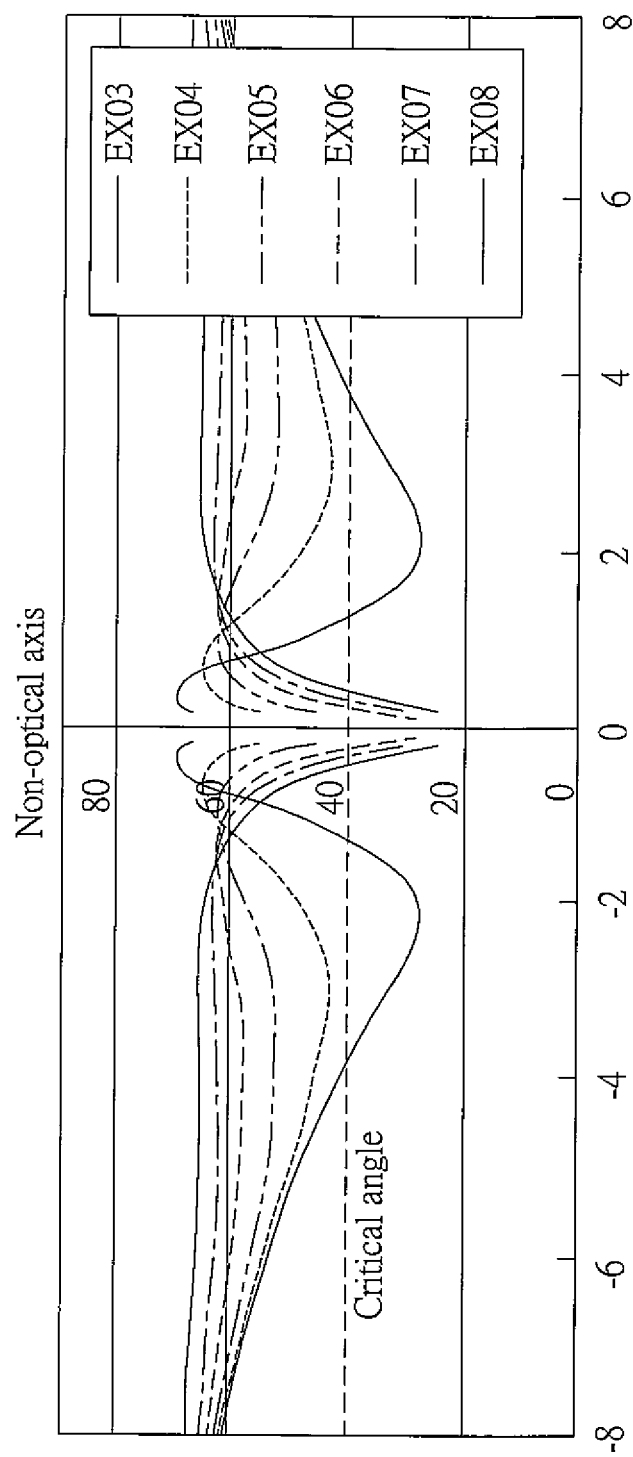
Figure 15A:
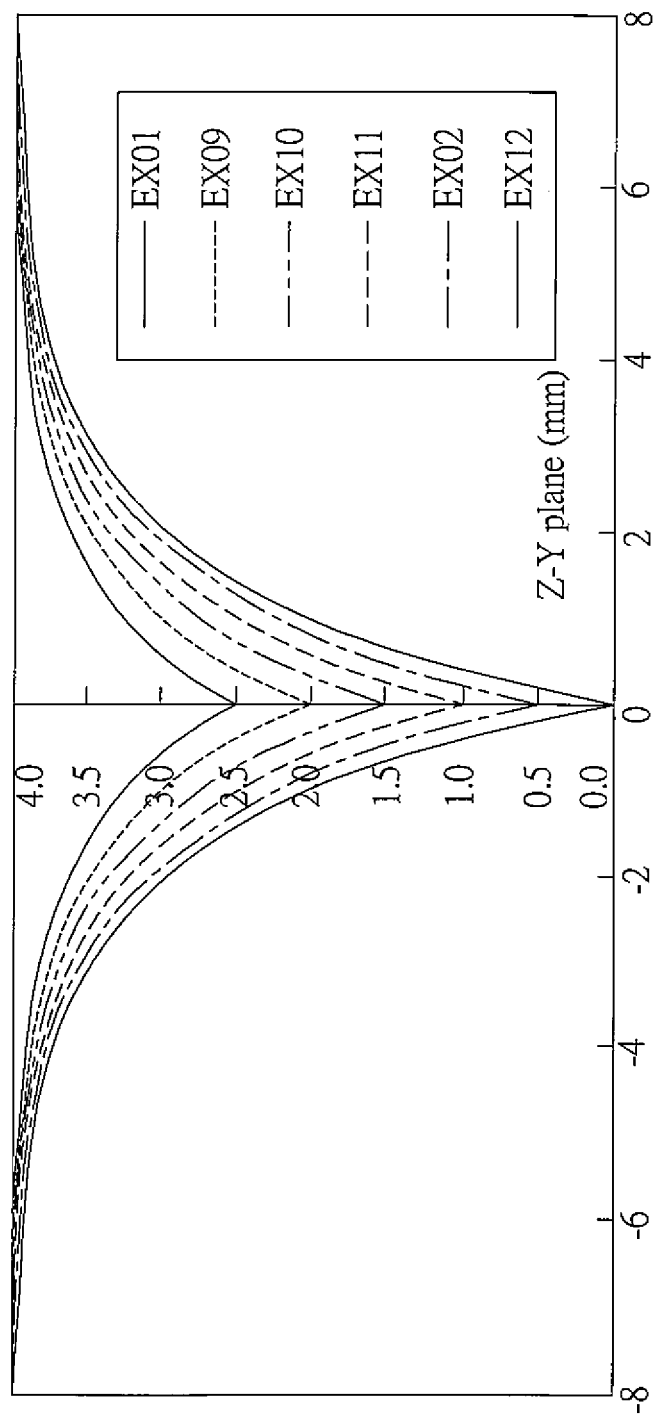
FIG. 15A, FIG. 15B and FIG. 15C demonstrate respectively the configuration curves of the asymmetric concave structure, the incident angles of non-optical axial rays and the incident angle of lateral reflected rays for the direct light guide structure of the present invention by applying parameters of Table 5 to Equation 3.
Figure 15B:
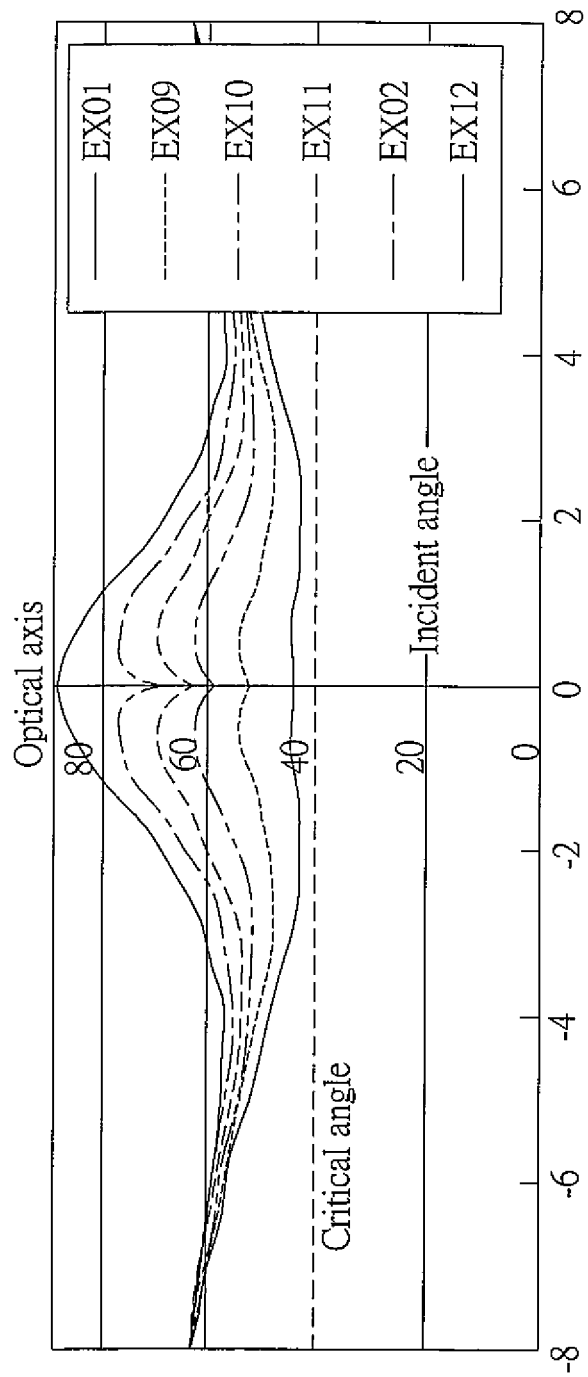
Figure 15C:
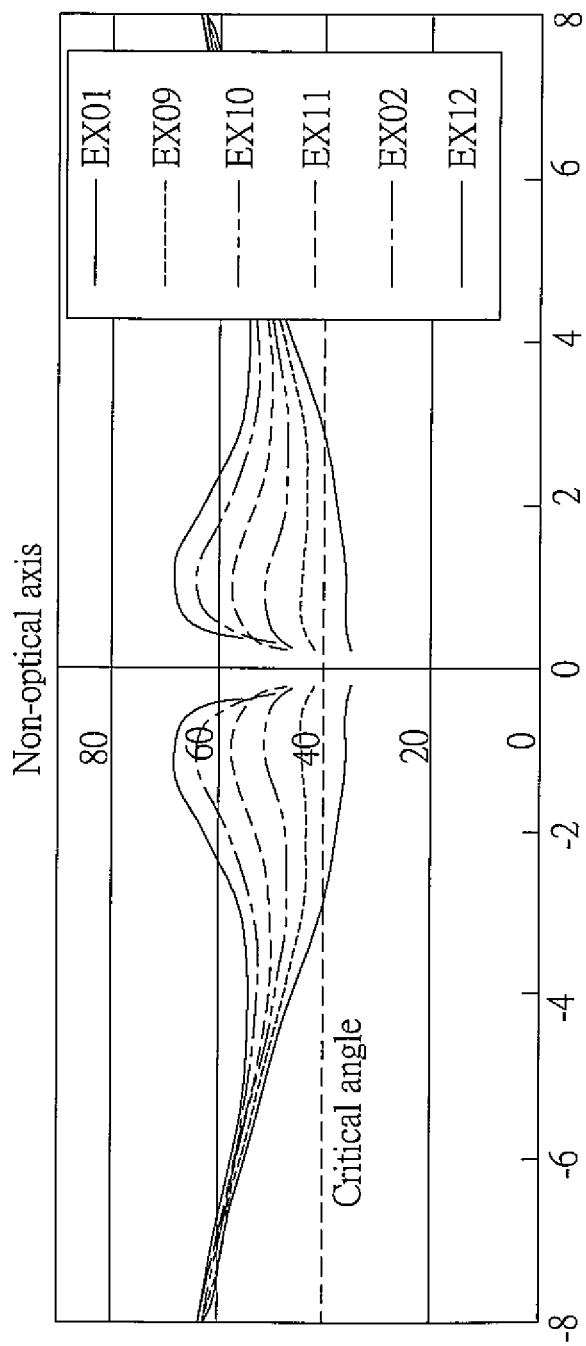
Figure 16A:
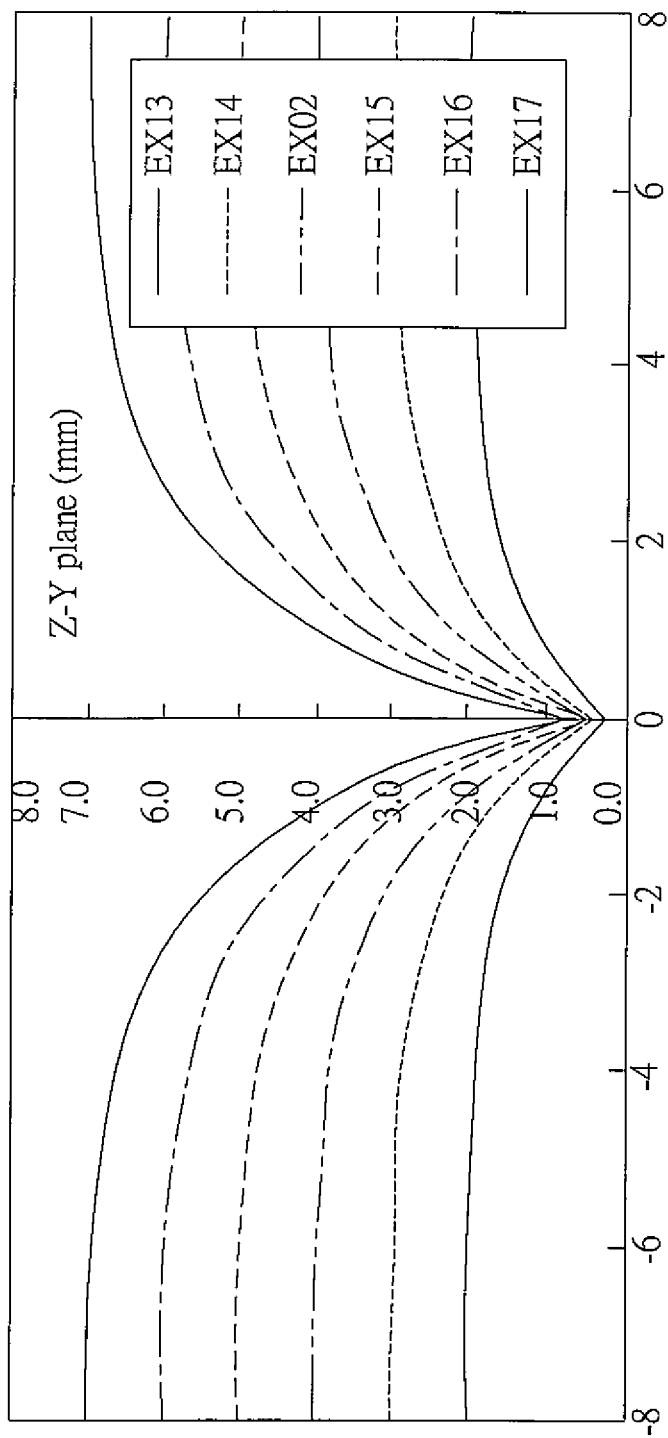
FIG. 16A, FIG. 16B and FIG. 16C demonstrate respectively the configuration curves of the asymmetric concave structure, the incident angles of non-optical axial rays and the incident angle of lateral reflected rays for the direct light guide structure of the present invention by applying parameters of Table 6 to Equation 3.
Figure 16B:
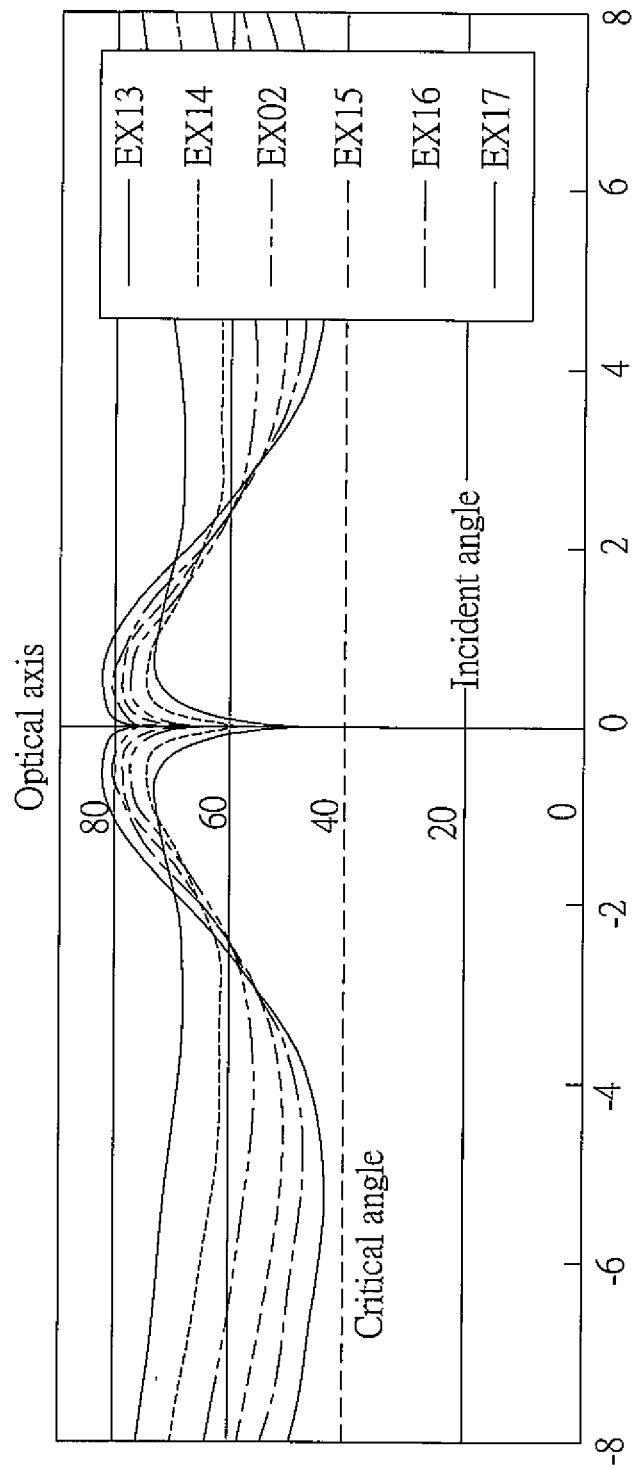
Figure 16C:
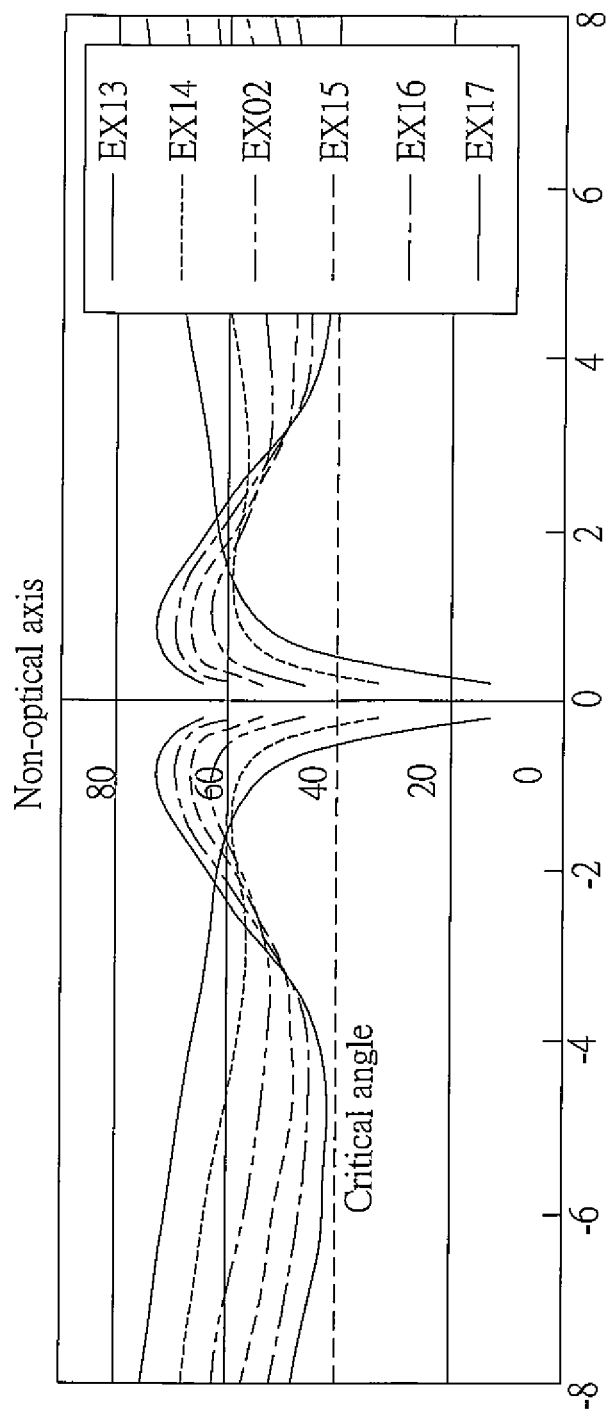

As shown in the preceding FIG. 8B, FIG. 9B and FIG. 10B and the following FIG. 14C, FIG. 15C and FIG. 16C, i.e. in considering the non-optical axial optics, the relationships between the incident angles of non-optical axial rays computed by plugging respective parameters into Equation 1 and Equation 2 and the critical angles are schematically shown.

Figure 13:
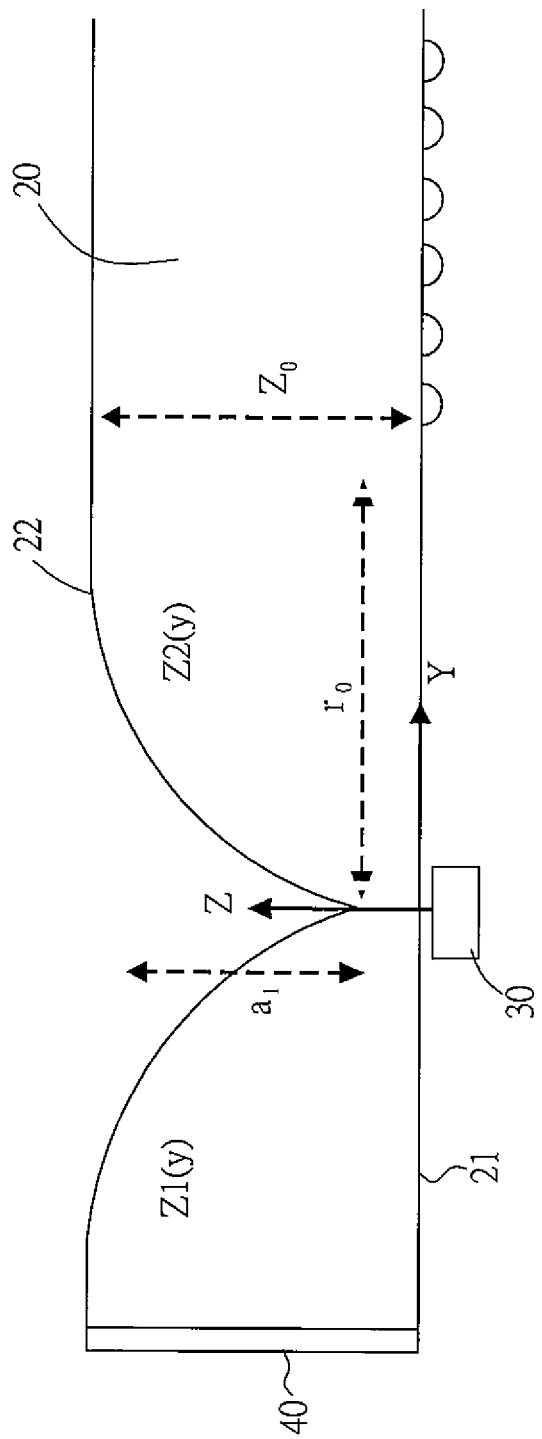
FIG. 13 shows a curved configuration of a symmetric concave structure for the direct light guide structure in accordance with the present invention.

Referring now to FIG. 13, a curved configuration of a symmetric concave structure for the direct light guide structure in accordance with the present invention is shown. In this embodiment, the symmetric concave structure on the top surface 22 of the light guide plate 20 is formed on the Y-Z plane crossing the central lowest point of the concave structure. It is shown that both curved configurations of the concave structure are formed as symmetric convex arc curves with respect to the Z axis passing the central lowest point of the concave structure. In the coordinate system, these two configuration curves can be treated as two curves originated at the same point y=0 on the Y-Z plane. Z1(y) and Z2(y) are defined as the distance variables between the respective configuration curves to the line of the bottom surface 21 of the light guide plate 20, in which Z1 is in the −Y lateral portion and Z2 is in the +Y main plate portion.

The symmetric curved configurations of the concave structure on the Y-Z plane can be expressed by the following function.

$$Z1(y)=Z2(y)=z0-a1*\exp(-|y|/t1) \text{ for } -r0<y<r0 \quad \text{Equation 3:}$$

in which z0 is the maximal thickness of the light guide plate 20, a1 is the maximal depth of the concave structure, t1 is the curve-varying variable for the concave structure, and r0 is the radius of the opening of the concave structure, Referring now to FIG. 14A, FIG. 14B and FIG. 14C, the configuration curves of the asymmetric concave structure, the incident angles of non-optical axial rays and the incident angle of lateral reflected rays for the direct light guide structure of the present invention by applying parameters of Table 4 to Equation 3 are demonstrated, respectively.

TABLE 4

Parameters, derived light-loss percentages and predicted incident angles for Embodiments with the fourth parameter combination

| | maximal thickness Z0 | maximal depth a1 | curve variable t1 | predicted incident angle | light-loss percentage % |
|---|---|---|---|---|---|
| Ex03 | 4 | 3.5 | 0.5 | X | 34.7 |
| Ex04 | 4 | 3.5 | 1.0 | ○ | 9.5 |
| Ex05 | 4 | 3.5 | 1.5 | ○ | 6.2 |
| Ex06 | 4 | 3.5 | 2.0 | X | 15.6 |
| Ex07 | 4 | 3.5 | 2.5 | X | 26.4 |
| Ex08 | 4 | 3.5 | 3.0 | X | 36.8 |

In Table 4, as 1≤t1≤1.5, the "predicted incident angle" column is filled with a qualified "O", and thus the light-loss percentage is relatively low to imply well optical performance.

Referring now to FIG. 15A, FIG. 15B and FIG. 15C, the configuration curves of the asymmetric concave structure, the incident angles of non-optical axial rays and the incident angle of lateral reflected rays for the direct light guide structure of the present invention by applying parameters of Table 5 to Equation 3 are demonstrated, respectively.

TABLE 5

Parameters, derived light-loss percentages and predicted incident angles for Embodiments with the fifth parameter combination

| | maximal thickness Z0 | maximal depth a1 | maximal depth ratio a1/Z0 (%) | curve variable t1 | predicted incident angle | light-loss percentage % |
|---|---|---|---|---|---|---|
| Ex01 | 4 | 1.5 | 37.5 | 1.5 | X | 65.1 |
| Ex09 | 4 | 2.0 | 50 | 1.5 | ◯ | 7.7 |
| Ex10 | 4 | 2.5 | 62.5 | 1.5 | ◯ | 5.4 |
| Ex11 | 4 | 3.0 | 75 | 1.5 | ◯ | 3.2 |
| Ex02 | 4 | 3.5 | 85 | 1.5 | ◯ | 8.6 |
| Ex12 | 4 | 3.99 | 99.99 | 1.5 | ◯ | 4.5 |

In Table 5, as 0%≤(a1/Z0)<100%, then the "predicted incident angle" column is filled with a qualified "O", and thus the light-loss percentage is relatively low to imply well optical performance.

Referring now to FIG. 16A, FIG. 16B and FIG. 16C, the configuration curves of the asymmetric concave structure, the incident angles of non-optical axial rays and the incident angle of lateral reflected rays for the direct light guide structure of the present invention by applying parameters of Table 6 to Equation 3 are demonstrated, respectively.

TABLE 6

Parameters, derived light-loss percentages and predicted incident angles for Embodiments with the sixth parameter combination

| | maximal thickness Z0 | maximal depth a1 | curve variable t1 | predicted incident angle | light-loss percentage % |
|---|---|---|---|---|---|
| Ex13 | 2 | 1.75 | 1.5 | X | 75.2 |
| Ex14 | 3 | 2.625 | 1.5 | X | 15.4 |
| Ex02 | 4 | 3.5 | 1.5 | ◯ | 8.6 |
| Ex15 | 5 | 4.375 | 1.5 | ◯ | 7.1 |
| Ex16 | 6 | 5.25 | 1.5 | ◯ | 6.5 |
| Ex17 | 7 | 6.125 | 1.5 | ◯ | 7.9 |

In Table 6, as 4≤Z0≤7, then the "predicted incident angle" column is filled with a qualified "O", and thus the light-loss percentage is relatively low to imply well optical performance.

While the present invention has been particularly shown and described with reference to a preferred embodiment, it will be understood by those skilled in the art that various changes in form and detail may be without departing from the spirit and scope of the present invention.

What is claimed is:

1. A direct light guide structure, applied to a light guide plate of a direct back-lit module, the light guide plate having a light-ejection surface and a light-inject surface opposing to the light-ejection surface, an orthogonal X-Y-Z coordinate system being defined with the light guide plate, a thickness of the light guide plate being extended in a Z direction, an X direction and a Y direction extending on the light-inject surface, the direct back-lit module having at least one point-light source located aside to the light-inject surface, the direct light guide structure comprising:

at least one concave structure, located on the light-ejection surface of the light guide plate, each of the at least one point-light source being disposed corresponding to the at least one concave structure so as to have a light ray emitted by the at least one point-light source to irradiate the at least one concave structure;

wherein each of the at least one concave structure has a central lowest point located at a place right above the at least one point-light source, and the central lowest point and the light-ejection surface are connected by continuous configurations;

wherein the continuous configurations of the concave structure on a Y-Z cutting plane crossing the central lowest point of the concave structure of the light guide plate are expressed as:

$$Z1(y)=z01-a1*\exp(-|y|/t1), \text{ for } -r01<y<0; \quad \text{Equation 1:}$$

$$Z2(y)=z02-a2*\exp(-|y|/t2), \text{ for } 0<y<r02; \quad \text{Equation 2:}$$

wherein the z01 and the z02 are maximal thicknesses for a lateral portion and a main plate portion of the light guide plate, respectively; the main plate portion is in a +Y direction while the lateral portion is in a -Y direction; the a1 and the a2 are maximal depths to the central lowest point from tops of the lateral portion and the main plate portion, respectively; the t1 and the t2 are variables for the configurations of the concave structure at the lateral portion and the main plate portion, respectively; the r01 and the r02 are radii of the concave structure with respect to a Z axis passing the central lowest point for the configurations of the concave structure at the lateral portion and the main plate portion, respectively; the Z1(y) expressed as a thickness variable defines the configuration curve for the concave structure at the lateral portion while the Z2(y) expressed also as another thickness variable defines the configuration curve for the concave structure at the main plate portion; and, the y is a real number ranging between -r01 and r02;

wherein 0.7≤t1≤1.4, 0.7≤t2≤1.5, 3 mm≤z02<7 mm, 3 mm<z01≤7 mm and 67%≤(a2/z02)<100%.

2. The direct light guide structure of claim 1, wherein the concave structure is an asymmetric concave structure having z01>z02 and 3.5 mm≤z01≤7 mm.

3. The direct light guide structure of claim 2, wherein the at least one point-light source has a at least two point-light sources, these point-light sources are located under the light-injection surface of the light guide plate in a cluster manner by closing to one of lateral side of the light guide plate, these point-light sources being evenly distributed to the light-inject surface of the light guide plate by extending in a longitudinal direction of the lateral side and by closing to a lower portion of the lateral side, wherein the Y-Z cutting plane is perpendicular to both the lateral side and the light-ejection surface.

4. The direct light guide structure of claim 3, wherein a reflection plate is mounted to a lateral side surface of the lateral side right at a place corresponding to these point-light sources, the reflector plate reflecting light rays emitted by these point-light sources totally back to the light guide plate.

5. A direct back-lit light guide plate, mounted in a direct back-lit module, the light guide plate having a light-ejection surface and a light-inject surface opposing to the light-ejection surface, an orthogonal X-Y-Z coordinate system being defined with the light guide plate, a thickness of the light guide plate being extended in a Z direction, an X direction and a Y direction extending on the light-inject surface, the direct back-lit module having at least one point-light source located aside to the light-inject surface, a direct light guide structure comprising at least one concave structure, located on the light-ejection surface of the light guide plate, each of the at least one point-light source being disposed corresponding to the at least one concave structure so as to have a light ray emitted by the at least one point-light source to irradiate the at least one concave structure;

wherein each of the at least one concave structure has a central lowest point located at a place right above the at least one point-light source, and the central lowest point and the light-ejection surface are connected by continuous configurations;

wherein the at least one point-light source comprises at least two point-light sources which are located under the light-injection surface of the light guide plate in a cluster manner by closing to one of lateral side of the light guide plate, the at least two point-light sources being evenly distributed to the light-inject surface of the light guide plate by extending in a longitudinal direction of the lateral side and by closing to a lower portion of the lateral side;

wherein a reflection plate is mounted to a lateral side surface of the lateral side right at a place corresponding to the at least two point-light sources, the reflector plate reflecting light rays emitted by the at least two point-light sources totally back to the light guide plate;

wherein the Y-Z cutting plane is perpendicular to both the lateral side and the light-ejection surface;

wherein the continuous configurations of the concave structure on a Y-Z cutting plane crossing the central lowest point of the concave structure of the light guide plate are expressed as:

$$Z1(y)=z01-a1*\exp(-|y|/t1), \text{ for } -r01<y<0; \quad \text{Equation 1:}$$

$$Z2(y)=z02-a2*\exp(-|y|/t2), \text{ for } 0<y<r02; \quad \text{Equation 2:}$$

wherein the z01 and the z02 are maximal thicknesses for a lateral portion and a main plate portion of the light guide plate, respectively; the main plate portion is in a +Y direction while the lateral portion is in a −Y direction; the a1 and the a2 are maximal depths to the central lowest point from tops of the lateral portion and the main plate portion, respectively; the t1 and the t2 are variables for the configurations of the concave structure at the lateral portion and the main plate portion, respectively; the r01 and the r02 are radii of the concave structure with respect to a Z axis passing the central lowest point for the configurations of the concave structure at the lateral portion and the main plate portion, respectively; the Z1(y) expressed as a thickness variable defines the configuration curve for the concave structure at the lateral portion while the Z2(y) expressed also as another thickness variable defines the configuration curve for the concave structure at the main plate portion; and, the y is a real number ranging between −r01 and r02;

wherein 0.7≤t1≤1.4, 0.7≤t2≤1.5, 3 mm≤z02<7 mm, 3 mm<z01≤7 mm and 67%≤(a2/z02)<100%.

6. The direct back-lit light guide plate of claim 5, wherein the concave structure is an asymmetric concave structure having z01>z02 and 3.5 mm≤z01≤7 mm.

7. A direct back-lit module, comprising at least one point-light source and a light guide plate, the light guide plate having a light-ejection surface and a light-inject surface opposing to the light-ejection surface, an orthogonal X-Y-Z coordinate system being defined with the light guide plate, a thickness of the light guide plate being extended in a Z direction, an X direction and a Y direction extending on the light-inject surface, the direct back-lit module having at least one point-light source located aside to the light-inject surface, a direct light guide structure comprising at least one concave structure, located on the light-ejection surface of the light guide plate, each of the at least one point-light source being disposed corresponding to the at least one concave structure so as to have a light ray emitted by the at least one point-light source to irradiate the at least one concave structure;

wherein each of the at least one concave structure has a central lowest point located at a place right above the at least one point-light source, and the central lowest point and the light-ejection surface are connected by continuous configurations;

wherein the at least one point-light source comprises at least two point-light sources which are located under the light-injection surface of the light guide plate in a cluster manner by closing to one of lateral side of the light guide plate, the at least two point-light sources being evenly distributed to the light-inject surface of the light guide plate by extending in a longitudinal direction of the lateral side and by closing to a lower portion of the lateral side;

wherein a reflection plate is mounted to a lateral side surface of the lateral side right at a place corresponding to the at least two point-light sources, the reflector plate reflecting light rays emitted by the at least two point-light sources totally back to the light guide plate;

wherein the Y-Z cutting plane is perpendicular to both the lateral side and the light-ejection surface;

wherein the continuous configurations of the concave structure on a Y-Z cutting plane crossing the central lowest point of the concave structure of the light guide plate are expressed as:

$$Z1(y)=z01-a1*\exp(-|y|/t1), \text{ for } -r01<y<0; \quad \text{Equation 1:}$$

$$Z2(y)=z02-a2*\exp(-|y|/t2), \text{ for } 0<y<r02; \quad \text{Equation 2:}$$

wherein the z01 and the z02 are maximal thicknesses for a lateral portion and a main plate portion of the light guide plate, respectively; the main plate portion is in a +Y direction while the lateral portion is in a −Y direction; the a1 and the a2 are maximal depths to the central lowest point from tops of the lateral portion and the main plate portion, respectively; the t1 and the t2 are variables for the configurations of the concave structure at the lateral portion and the main plate portion, respectively; the r01 and the r02 are radii of the concave structure with respect to a Z axis passing the central lowest point for the configurations of the concave structure at the lateral portion and the main plate portion, respectively; the Z1(y) expressed as a thickness variable defines the configuration curve for the concave structure at the lateral portion while the Z2(y) expressed also as another thickness variable defines the configuration curve for the concave structure at the main plate portion; and, the y is a real number ranging between −r01 and r02;

wherein 0.7≤t1≤1.4, 0.7≤t2≤1.5, 3 mm≤z02<7 mm, 3 mm<z01≤7 mm and 67%≤(a2/z02)<100%.

8. The direct back-lit module of claim 7, wherein the concave structure is an asymmetric concave structure having z01>z02 and 3.5 mm≤z01≤7 mm.

* * * * *